United States Patent
Yamaguchi

(10) Patent No.: US 12,105,921 B2
(45) Date of Patent: Oct. 1, 2024

(54) IMAGE FORMING APPARATUS, JIG USED FOR OPERATING IMAGE FORMING APPARATUS, AND ELECTRONIC DEVICE

(71) Applicant: SEIKO EPSON CORPORATION, Tokyo (JP)

(72) Inventor: Yoshiyuki Yamaguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/180,247

(22) Filed: Mar. 8, 2023

(65) Prior Publication Data
US 2023/0305666 A1  Sep. 28, 2023

(30) Foreign Application Priority Data
Mar. 10, 2022  (JP) .................. 2022-036970

(51) Int. Cl.
*G06F 3/044* (2006.01)
*G03G 15/00* (2006.01)
(Continued)

(52) U.S. Cl.
CPC ....... *G06F 3/0446* (2019.05); *G03G 15/5016* (2013.01); *G03G 15/5079* (2013.01); *G06F 3/0416* (2013.01); *G06F 3/12* (2013.01); *G06F 3/1201* (2013.01); *G06F 3/1229* (2013.01); *G06F 3/1237* (2013.01);
(Continued)

(58) Field of Classification Search
CPC ....... H04N 1/00411; H04N 2201/0094; H04N 1/00344; H04N 1/00084; H04N 1/00408; H04N 1/00389; G03G 15/5079; G03G 15/5016; G03G 15/5091; G03G 15/70; G06F 3/121; G06F 3/1229; G06F 3/1239; G06F 3/1253; G06F 21/31; G06F 3/1238; G06F 3/1234; G06F 3/14; G06F 3/0446; G06F 3/0488; G06F 3/044; G06F 3/1201; G06F 3/1237; G06F 3/04186; G06F 3/1288; G06F 3/1271
See application file for complete search history.

(56) References Cited

U.S. PATENT DOCUMENTS

2006/0067722 A1* 3/2006 Toyoda ................ G03G 15/502
399/80
2008/0012836 A1* 1/2008 Yokota ............... H04N 1/00352
345/173
(Continued)

FOREIGN PATENT DOCUMENTS

JP  2021-081505 A  5/2021

*Primary Examiner* — Dismery Mercedes
(74) *Attorney, Agent, or Firm* — Global IP Counselors, LLP

(57) ABSTRACT

An image forming apparatus includes an image formation unit that executes image formation processing to form an image, a control unit, and an interface unit including a display unit and a touch panel. The touch panel includes first detection points and second detection points. The control unit can control the image formation unit in accordance with a first mode of accepting a first instruction from the touch panel, and a second mode of accepting the second instruction from the touch panel. The control unit permits switching from the first mode to the second mode when contact with the eleven or more first detection points is detected and when contact with the one or more second detection points is not detected.

4 Claims, 25 Drawing Sheets

(51) Int. Cl.
    *G06F 3/041*    (2006.01)
    *G06F 3/12*     (2006.01)
    *H04N 1/00*     (2006.01)

(52) U.S. Cl.
    CPC ....... *G06F 3/1238* (2013.01); *H04N 1/00344* (2013.01); *H04N 1/00411* (2013.01); *H04N 2201/0094* (2013.01)

(56) References Cited

U.S. PATENT DOCUMENTS

| | | | | |
|---|---|---|---|---|
| 2011/0042152 | A1* | 2/2011 | Wu | G06F 3/04166 |
| | | | | 345/173 |
| 2013/0194203 | A1* | 8/2013 | Tu | G06F 3/04166 |
| | | | | 345/173 |
| 2015/0181056 | A1* | 6/2015 | Mutsuno | G06F 3/1236 |
| | | | | 358/1.14 |
| 2016/0021265 | A1* | 1/2016 | Tagaki | G06F 3/041 |
| | | | | 345/173 |
| 2016/0077620 | A1* | 3/2016 | Choi | G06F 3/041 |
| | | | | 345/173 |
| 2017/0177094 | A1* | 6/2017 | Takatsuki | H04N 1/00389 |
| 2017/0205728 | A1* | 7/2017 | Toichi | G03G 15/0266 |
| 2018/0032020 | A1* | 2/2018 | Shintani | G03G 15/70 |
| 2021/0377402 | A1* | 12/2021 | Kohara | H04N 1/00411 |
| 2022/0382449 | A1* | 12/2022 | Morita | G06F 3/0488 |

\* cited by examiner

FIG. 6
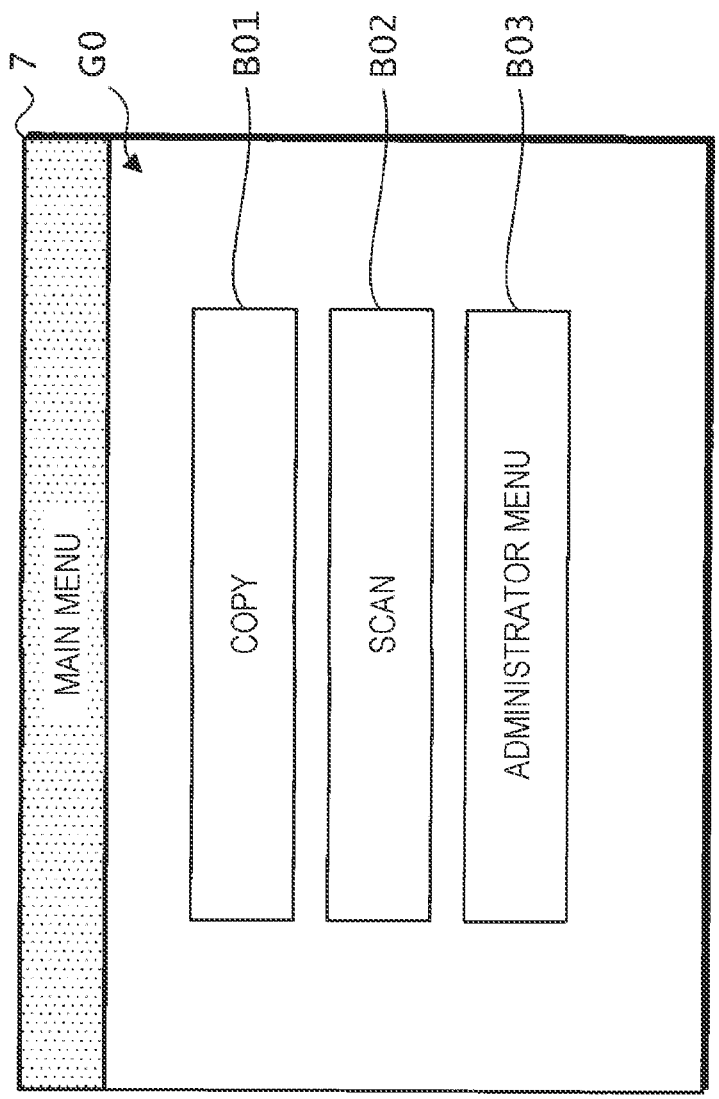
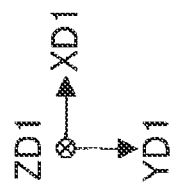

FIG. 14
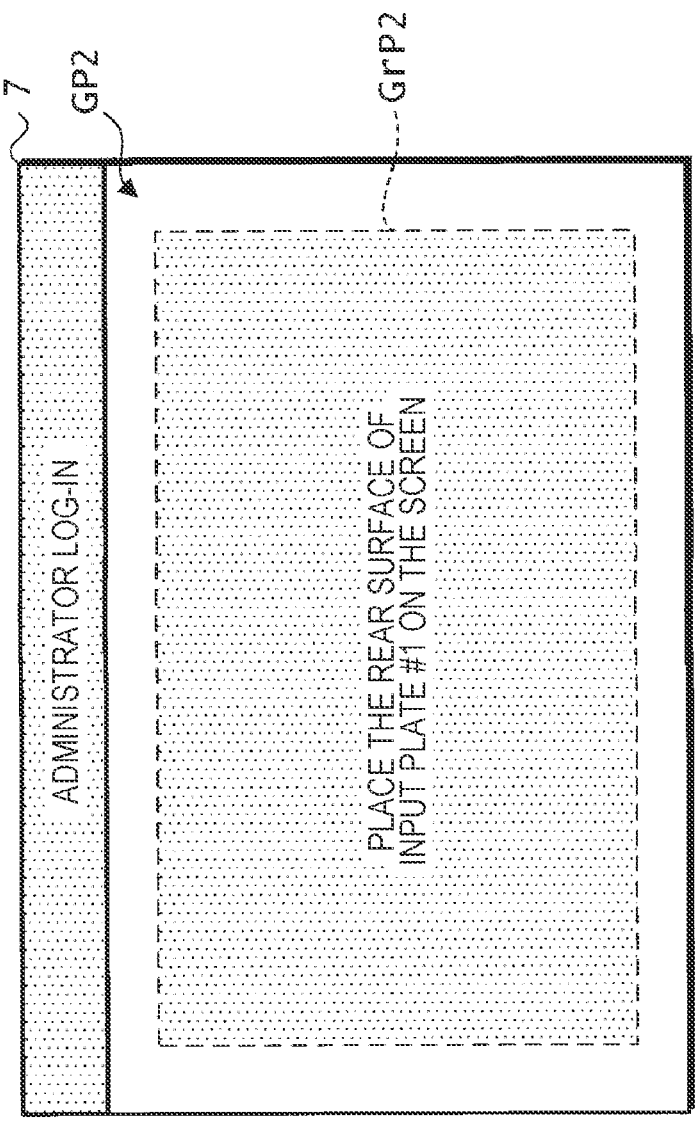
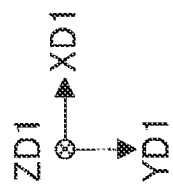

FIG. 21
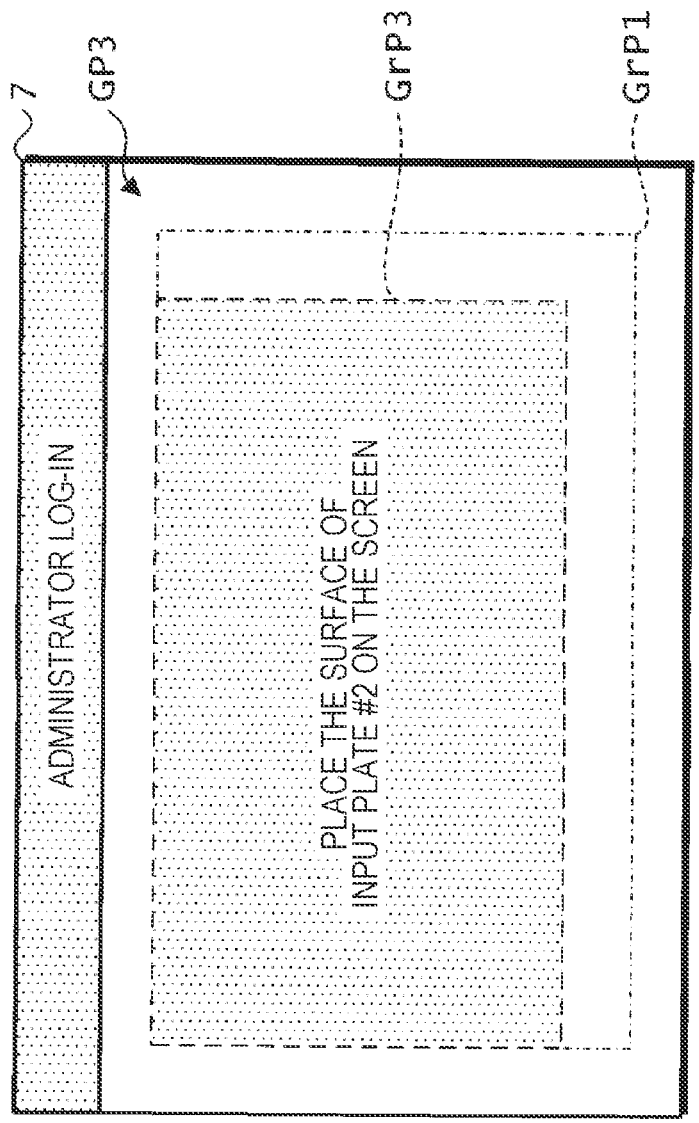
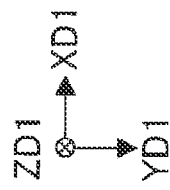

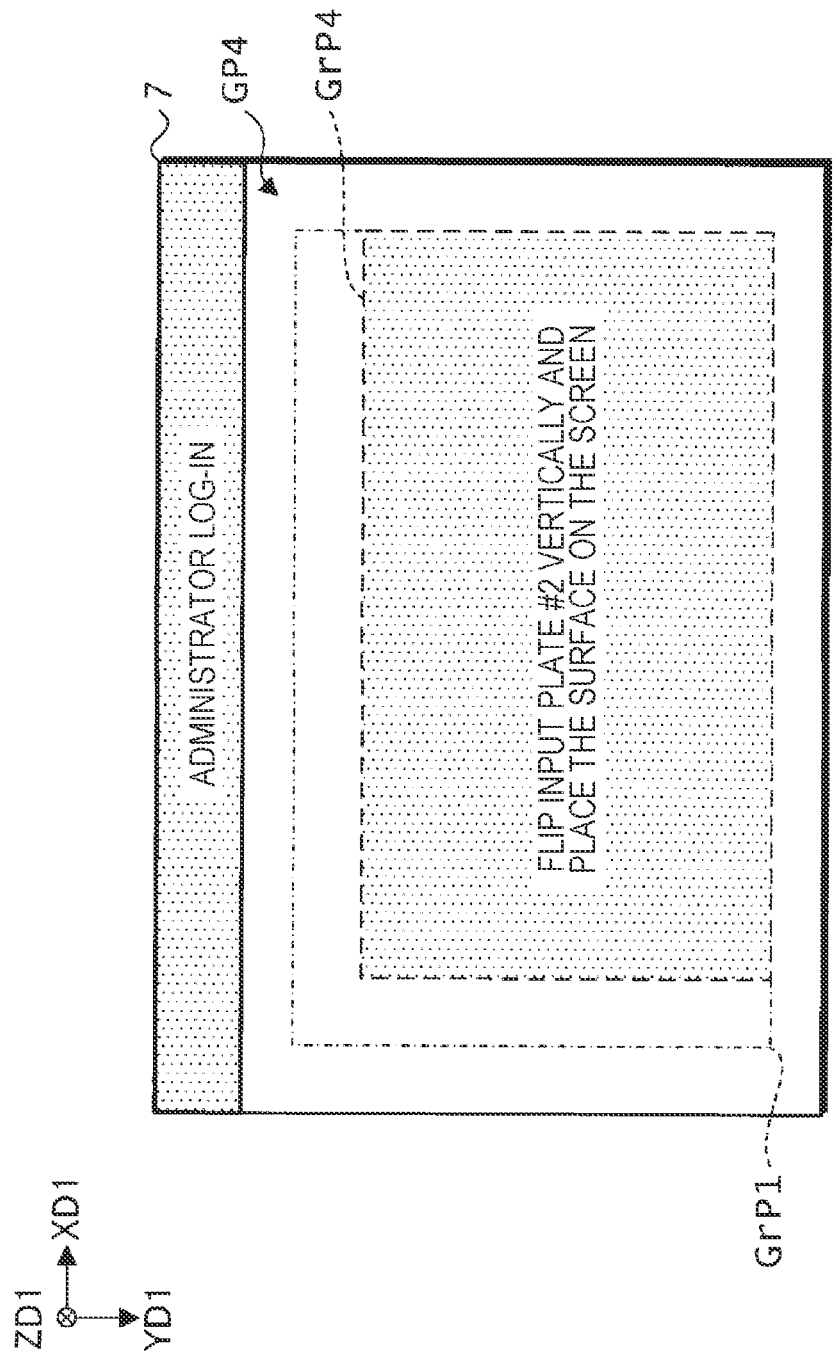

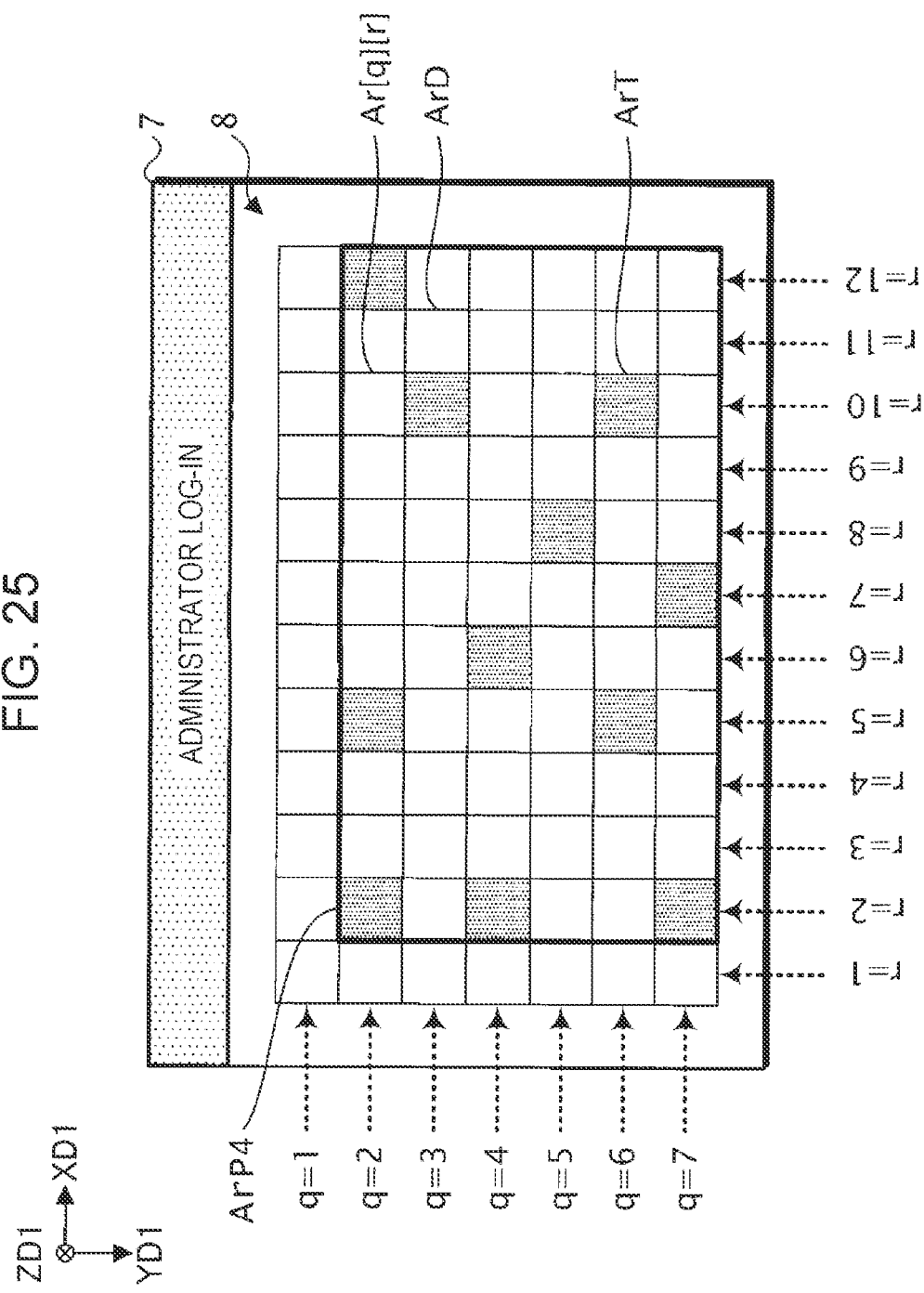

IMAGE FORMING APPARATUS, JIG USED FOR OPERATING IMAGE FORMING APPARATUS, AND ELECTRONIC DEVICE

The present application is based on, and claims priority from JP Application Serial Number 2022-036970, filed Mar. 10, 2022, the disclosure of which is hereby incorporated by reference herein in its entirety.

BACKGROUND

1. Technical Field

The present disclosure relates to an image forming apparatus, a jig used for operating an image forming apparatus, and an electronic device.

2. Related Art

There has been known a technique concerning an image forming apparatus, which is provided with an image formation unit that executes image formation processing to form an image on a medium and a control unit that controls the image formation unit, and is operable in multiple operation modes. For example, JP-A-2021-081505 describes an image forming apparatus which is operable in a neutral mode that is an operation mode applied when the image forming apparatus is powered on and in a management operation mode that is an operation mode applied when an administrator of the image forming apparatus conducts a management operation.

When the image forming apparatus is operated in the management operation mode, an operator of the image forming apparatus needs to be restricted to an administrator of the image forming apparatus since the management operation of the image forming apparatus is enabled. For this reason, in the image forming apparatus, an instruction to change the operation mode of the image forming apparatus to the management operation mode is inputted by using a capacitive touch panel. However, there is a risk of execution of an incorrect management operation when a person who is not the administrator erroneously inputs the instruction to change the operation mode of the image forming apparatus to the management operation mode by using the touch panel. On the other hand, there is a risk of execution of an unauthorized management operation when a person who is not the administrator improperly inputs the instruction to change the operation mode of the image forming apparatus to the management operation mode by using the touch panel in spite of being not authorized to do so. The above-mentioned risks also exist in various electronic devices other than the image forming apparatus.

SUMMARY

To solve the above-described problem, an image forming apparatus according to the present disclosure is an image forming apparatus including: an image formation unit that executes image formation processing to form an image on a medium; a control unit that controls the image formation unit; and an interface unit including a display unit that displays information to a user, and a capacitive touch panel that accepts an instruction from the user, in which the touch panel includes six hundred or more detection points including eleven or more first detection points, and one or more second detection points, the control unit is configured to control the image formation unit in accordance with operation modes including a first mode of accepting a first instruction from the touch panel to cause the image formation unit to execute the image formation processing and of restricting acceptance of a second instruction from the touch panel to cause the image formation unit to execute processing concerning maintenance, and a second mode of accepting the second instruction from the touch panel, and on a condition that the control unit controls the image formation unit in accordance with the first mode, the control unit permits switching of the operation mode from the first mode to the second mode when contact with the eleven or more first detection points is detected and when contact with the one or more second detection points is not detected.

A jig according to the present disclosure is a jig used for operating an image forming apparatus including an image formation unit that executes image formation processing to form an image on a medium, a control unit that controls the image formation unit, and an interface unit including a display unit that displays information to a user, and a capacitive touch panel that accepts an instruction from the user, in which the touch panel includes six hundred or more detection points including eleven or more first detection points, and one or more second detection points, the control unit is configured to control the image formation unit in accordance with operation modes including a first mode of accepting a first instruction from the touch panel to cause the image formation unit to execute the image formation processing and of restricting acceptance of a second instruction from the touch panel to cause the image formation unit to execute processing concerning maintenance, and a second mode of accepting the second instruction from the touch panel, and on a condition that the control unit controls the image formation unit in accordance with the first mode, the control unit permits switching of the operation mode from the first mode to the second mode when contact with the eleven or more first detection points is detected and when contact with the one or more second detection points is not detected, the jig including: eleven or more first contact points provided on a first surface of the jig and being set to a predetermined contact potential, in which the eleven or more first contact points come into contact with all the eleven or more first detection points and come into contact with none of the one or more second detection points when the first surface of the jig is disposed to be brought into surface contact with the touch panel.

A jig according to the present disclosure is a jig used for operating an image forming apparatus including an image formation unit that executes image formation processing to form an image on a medium, a control unit that controls the image formation unit, and an interface unit including a display unit that displays information to a user, and a capacitive touch panel that accepts an instruction from the user, in which the touch panel includes six hundred or more detection points including eleven or more first detection points, one or more second detection points, eleven or more third detection points, and one or more fourth detection points, the control unit is configured to control the image formation unit in accordance with operation modes including a first mode of accepting a first instruction from the touch panel to cause the image formation unit to execute the image formation processing and of restricting acceptance of a second instruction from the touch panel to cause the image formation unit to execute processing concerning maintenance, and a second mode of accepting the second instruction from the touch panel, and on a condition that the control unit controls the image formation unit in accordance with the first mode, the control unit permits switching of the operation mode from the first mode to the second mode when contact with the eleven or more first detection points is detected, when contact with the one or more second detection points is not detected, when contact with the eleven or more third detection points is detected, and when contact with the one or more fourth detection points is not detected, the jig including: eleven or more first contact points provided on a first surface of the jig and being set to a predetermined contact potential, in which the eleven or more first contact points come into contact with all the eleven or more first detection points and come into contact with none of the one or more second detection points when the first surface of the jig is disposed to be brought into surface contact with the touch panel and when the jig is set to a first orientation and disposed at a first position of the touch panel, and the eleven or more first contact points come into contact with all the eleven or more third detection points and come into contact with none of the one or more fourth detection points when the first surface of the jig is disposed to be brought into surface contact with the touch panel and when the jig is set to a second orientation and disposed at a second position of the touch panel.

An electronic device according to the present disclosure is an electronic device including: a control unit that controls a driving unit; and an interface unit including a display unit that displays information to a user, and a capacitive touch panel that accepts an instruction from the user, in which the touch panel includes six hundred or more detection points including eleven or more first detection points, and one or more second detection points, the control unit is configured to control the driving unit in accordance with operation modes including a first mode of accepting a first instruction from the touch panel to drive the driving unit and of restricting acceptance of a second instruction from the touch panel to cause the driving unit to execute processing concerning maintenance, and a second mode of accepting the second instruction from the touch panel, and on a condition that the control unit controls the driving unit in accordance with the first mode, the control unit permits switching of the operation mode from the first mode to the second mode when contact with the eleven or more first detection points is detected and when contact with the one or more second detection points is not detected.

BRIEF DESCRIPTION OF THE DRAWINGS

FIG. 6 is a diagram illustrating an example of a main menu screen.

FIG. 14 is a diagram illustrating an example of an administrator log-in screen according to Modified Example 1.

FIG. 21 is a diagram illustrating an example of an administrator log-in screen according to Modified Example 2.

FIG. 24 is a diagram illustrating an example of another administrator log-in screen according to the Modified Example 2.

FIG. 25 is a diagram illustrating an example of another input acceptance area according to the Modified Example 2.

DESCRIPTION OF EXEMPLARY EMBODIMENTS

An embodiment for carrying out the present disclosure will be described below with reference to the drawings. It is to be noted, however, that dimensions and scales of components in the respective drawings are different from actual ones as appropriate. Meanwhile, various technically preferable limitations are added to the following embodiment so as to represent a preferred specific example of the present disclosure. Nonetheless, the scope of the present disclosure is not limited to the following modes unless there is a specific statement to limit a configuration of the present disclosure in the following description.

A. EMBODIMENT

An image forming apparatus will be described in the present embodiment by depicting a printing apparatus 100 as an example.

1. Configuration of Printing Apparatus

An outline of the printing apparatus 100 according to the present embodiment will be described below with reference to FIGS. 1 to 5.

Figure 1:
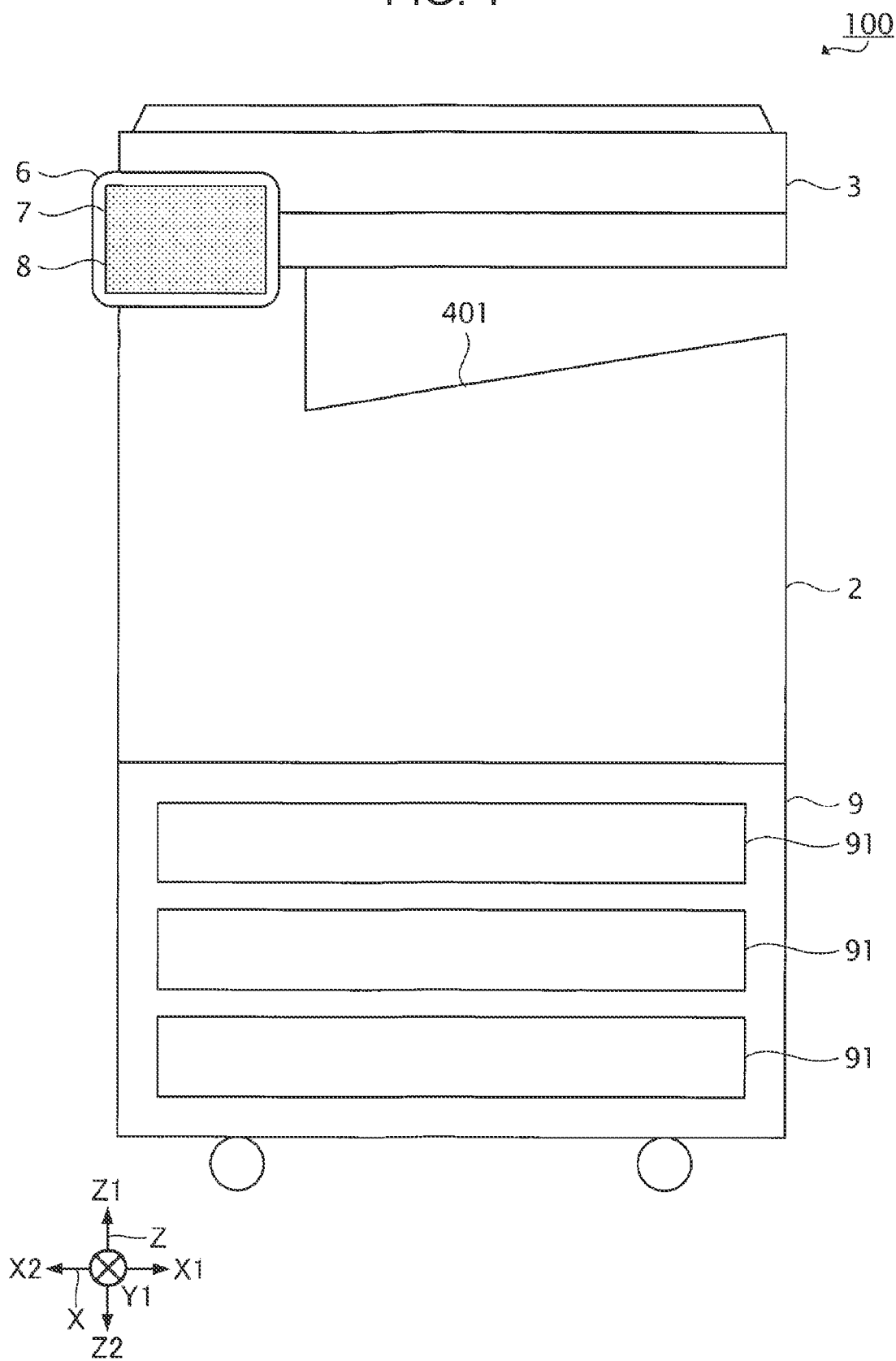
FIG. 1 is a diagram illustrating an example of external appearance of a printing apparatus according to an embodiment of the present disclosure.
Figure 2:
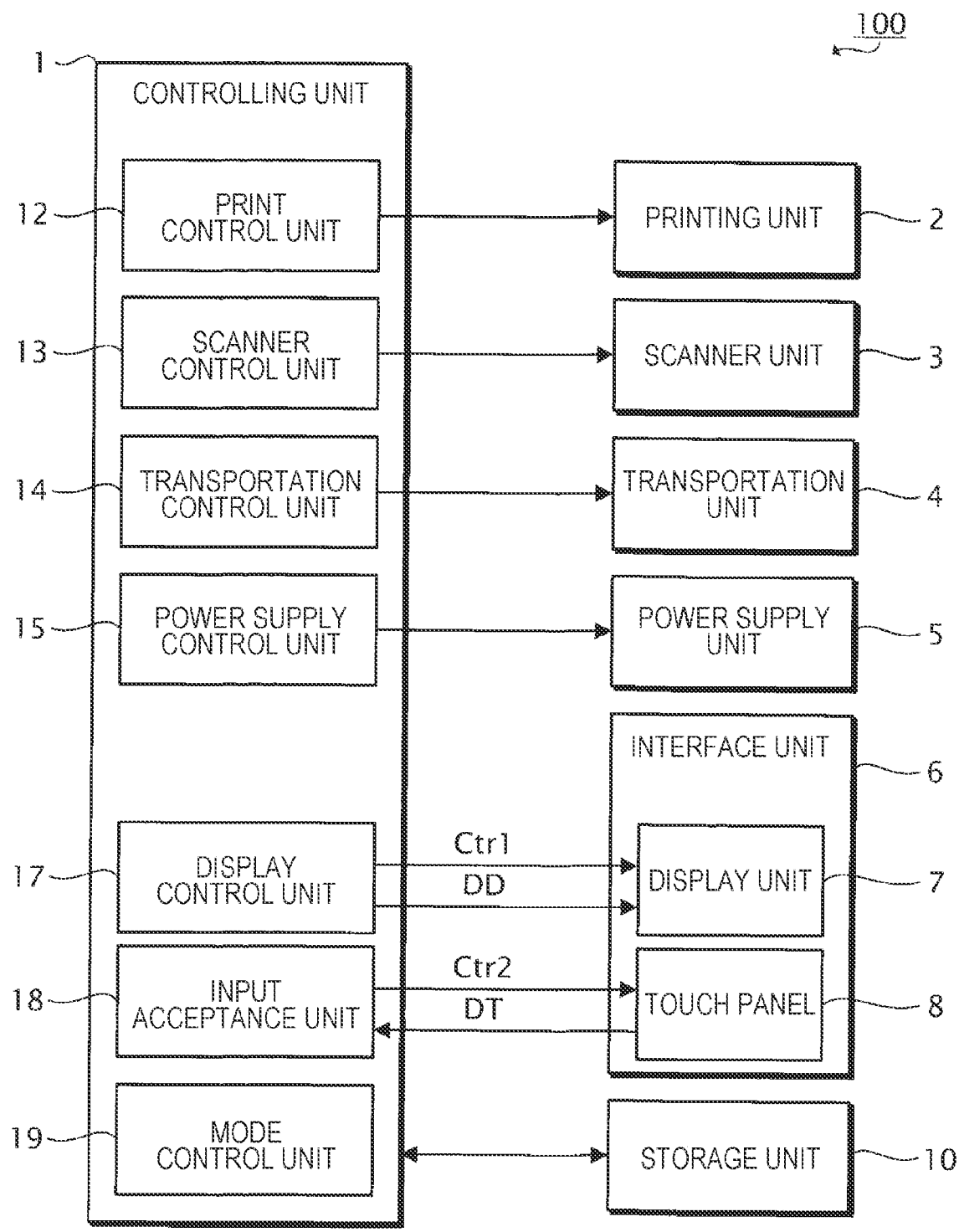
FIG. 2 is a block diagram illustrating an example of a configuration of the printing apparatus.

FIG. 1 is a diagram illustrating an example of external appearance of the printing apparatus 100. FIG. 2 is a functional block diagram illustrating an example of a functional configuration of the printing apparatus 100.

As illustrated in FIGS. 1 and 2, the printing apparatus 100 includes a controlling unit 1 that controls the printing apparatus 100, a printing unit 2 that executes print processing to form an image by ejecting an ink onto print paper PP, a scanner unit 3 for reading an image formed on any of the print paper PP and other media, a transportation unit 4 for transporting the print paper PP inside the printing apparatus 100, a power supply unit 5 that supplies electric power to respective constituents of the printing apparatus 100, an interface unit 6 that includes a display unit 7 to display a variety of information to a user of the printing apparatus 100 and to an administrator of the printing apparatus 100 as well as a touch panel 8 to accept input of commands from the user of the printing apparatus 100 and the administrator of the printing apparatus 100, a sheet feeder unit 9 provided with container cassettes 91 to contain the print paper PP, and a storage unit 10 that stores the variety of information.

Here, the controlling unit 1 is an example of a "control unit". The printing unit 2 is an example of an "image formation unit". The print paper PP is an example of a "medium". The print processing is an example of "image formation processing". Meanwhile, the user of the printing apparatus 100 and the administrator of the printing apparatus 100 may be hereinafter collectively referred to as an operator of the printing apparatus 100 as appropriate.

As illustrated in FIG. 1, the printing unit 2 is provided in Z1 direction when viewed from the sheet feeder unit 9. The scanner unit 3 is provided in the Z1 direction when viewed from the printing unit 2. The Z1 direction and Z2 direction being opposite to the Z1 direction will be hereinafter collectively referred to as Z axis direction. The Z2 direction is a vertical direction, for example. Meanwhile, X1 direction along the X axis intersecting with the Z axis and X2 direction being opposite to the X1 direction will be collectively referred to as X axis direction. Moreover, Y1 direction along the Y axis intersecting with the Z axis as well as the X axis and Y2 direction being opposite to the Y1 direction will be collectively referred to as Y axis direction. The present embodiment will describe an example in which the X axis, the Y axis, and the Z axis are orthogonal to one another. However, the present disclosure is not limited only to this configuration. The X axis, the Y axis, and the Z axis only need to intersect with one another.

The transportation unit 4 supplies the print paper PP contained in the container cassettes 91 to the printing unit 2. When the printing unit 2 forms an image on the print paper PP, the transportation unit 4 discharges this print paper PP to a discharge tray 401.

The controlling unit 1 includes a processing circuit such as a CPU and an FPGA, and controls the respective constituents of the printing apparatus 100. Here, CPU stands for central processing unit and FPGA stands for field programmable gate array.

As illustrated in FIG. 2, the controlling unit 1 can function as a print control unit 12 that controls the printing unit 2, a scanner control unit 13 that controls the scanner unit 3, a transportation control unit 14 that controls the transportation unit 4, and a power supply control unit 15 that controls the power supply unit 5. The controlling unit 1 can also function as a display control unit 17, an input acceptance unit 18, and a mode control unit 19.

The mode control unit 19 changes an operation mode of the printing apparatus 100. The printing apparatus 100 is operated in accordance with the operation mode of the printing apparatus 100. The controlling unit 1 controls the printing apparatus 100 in accordance with the operation mode. The present embodiment assumes that there are multiple operation modes as the operation modes of the printing apparatus 100, including a general operation mode to accept a command concerning the print processing by the user of the printing apparatus 100 and to restrict or reject acceptance of a command concerning a management operation of the printing apparatus 100 by the user of the printing apparatus 100, and a management operation mode to accept the command concerning the management operation of the printing apparatus 100 by the administrator of the printing apparatus 100, for example.

Here, the administrator of the printing apparatus 100 is a person who conducts the management operation of the printing apparatus 100, which is a concept including a serviceperson who carries out inspection work on the printing apparatus 100, a maintainer who carries out maintenance work on the printing apparatus 100, and so forth. The management operation of the printing apparatus 100 is a concept including a maintenance operation and a maintenance check operation. On the other hand, the user of the printing apparatus 100 is a person who is not authorized to carry out the management operation of the printing apparatus 100, namely, a general user of the printing apparatus 100.

In the present embodiment, the command concerning the print processing is an example of a "first instruction", and the command concerning the management operation of the printing apparatus 100 is an example of a "second instruction". Moreover, in the present embodiment, the general operation mode is an example of a "first mode" and the management operation mode is an example of a "second mode".

The display control unit 17 generates a control signal Ctrl for controlling the display unit 7 and display information DD indicating an image to be displayed on the display unit 7, and supplies the control signal Ctrl and the display information DD thus generated to the display unit 7. For the purpose of distinction from the image to be formed on the print paper PP by the printing unit 2 in the print processing, the image to be displayed on the display unit 7 will be referred to as a display screen G and the image to be formed on the print paper PP will be hereinafter referred to as a printed image PPT.

Figure 3:
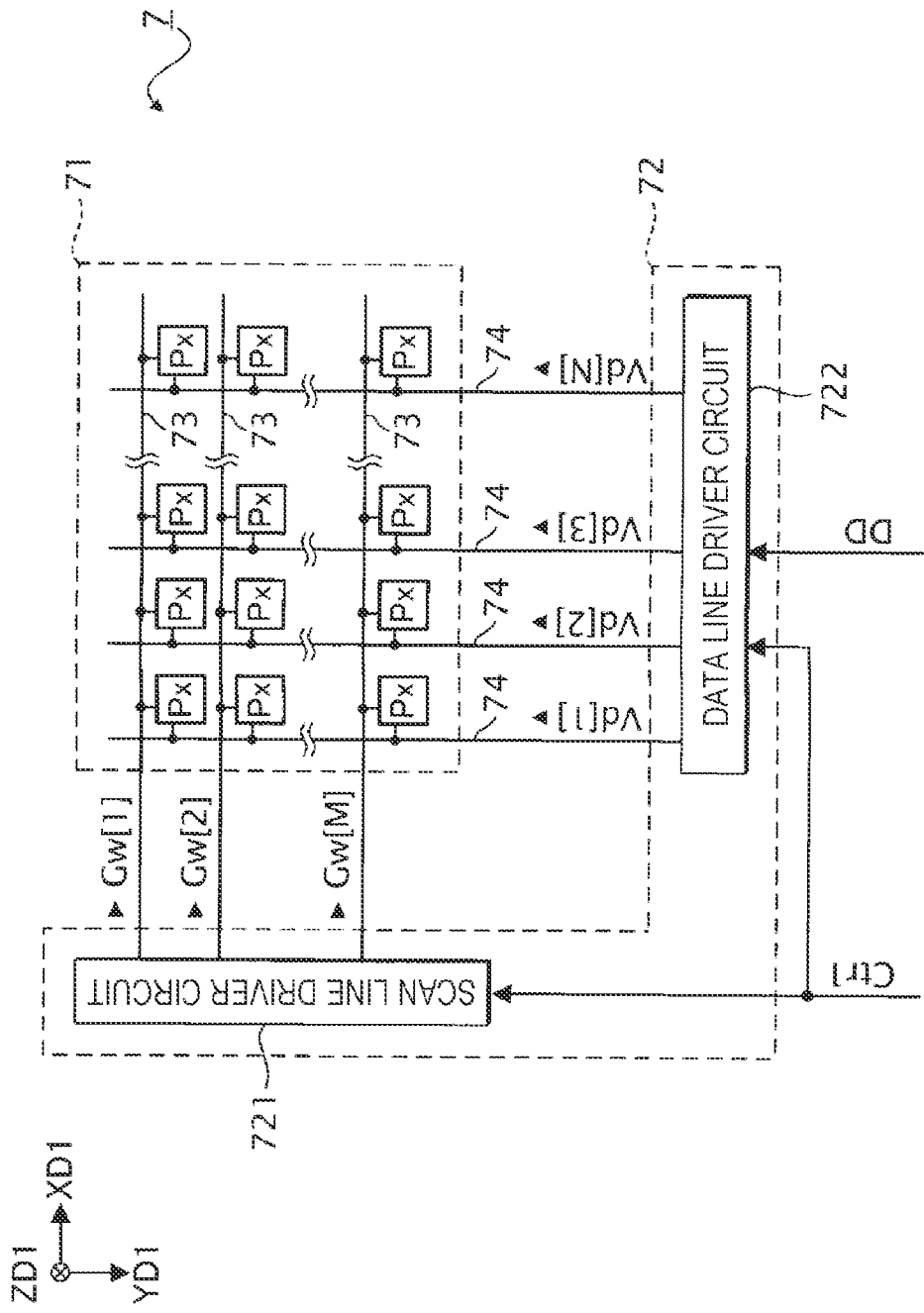
FIG. 3 is a block diagram illustrating an example of a configuration of a display unit.

FIG. 3 is a block diagram illustrating an example of a configuration of the display unit 7.

As illustrated in FIG. 3, the display unit 7 includes a display module 71 provided with multiple pixels Px and a driving circuit 72 that drives the display module 71.

The display module 71 includes M rows of scan lines 73 extending in XD1 direction, N columns of data lines 74 extending in YD1 direction that intersects with the XD1 direction, and (M×N) pixels Px corresponding to (M×N) intersections formed by M rows of the scan lines 73 and N columns of the data lines 74, and being arranged in a matrix of M rows in the YD1 direction and N columns in the XD1 direction. Here, the value M is a natural number that satisfies M≥2, and the value N is a natural number that satisfies N≥2.

The XD1 direction and XD2 direction being opposite to the XD1 direction will be hereinafter collectively referred to XD axis direction, the YD1 direction and YD2 direction being opposite to the YD1 direction will be collectively referred to YD axis direction, and ZD1 direction intersecting XD axis direction and YD axis direction, and ZD2 direction being opposite to the ZD1 direction will be collectively referred to ZD axis direction. In the present embodiment, the ZD1 direction is a direction heading from the operator of the printing apparatus 100 to the display unit 7, for example.

The present embodiment will describe an example in which the XD axis, the YD axis, and the ZD axis are orthogonal to one another. However, the present disclosure is not limited only to this configuration. The XD axis, the YD axis, and the ZD axis only need to intersect with one another.

The driving circuit 72 includes a scan line driver circuit 721 and a data line driver circuit 722.

The scan line driver circuit 721 generates a selection signal Gw[m] for selecting the scan line 73 on an m-th row based on the control signal Ctr1. Then, the scan line driver circuit 721 sets a signal level of the selection signal Gw[m] to a predetermined signal level for selecting the scan line 73 on the m-th row in an m-th horizontal scanning period out of M horizontal scanning periods included in a frame period defined by the control signal Ctr1. Thus, scan line driver circuit 721 can sequentially select the scan lines 73 from a first row to an M-th row in the frame period. Here, the parameter m is a natural number that satisfies $1 \leq m \leq M$.

The data line driver circuit 722 generates a gradation designating signal Vd[n] that designate gradation to be displayed with the pixel Px based on the display information DD, and outputs the generated gradation designating signal Vd[n] to the data line 74 on an n-th column in the m-th horizontal scanning period in which the scan line driver circuit 721 selects the scan line 73 on the m-th row. Here, the parameter n is a natural number that satisfies $1 \leq n \leq N$. Meanwhile, the gradation designating signal Vd[n] may be a signal containing gradation designating signals Vd[1] to Vd[N].

As described above, the driving circuit 72 outputs the selection signal Gw[m] for selecting the scan line 73 on the m-th row in the m-th horizontal scanning period, and outputs the gradation designating signal Vd[n] to the data line 74 on the n-th column. Thus, the driving circuit 72 can cause the pixel Px on the m-th row and the n-th column to display the gradation designated by the gradation designating signal Vd[n].

Let us return to the explanation of FIG. 2.

As illustrated in FIG. 2, the input acceptance unit 18 generates a control signal Ctr2 for controlling the touch panel 8, and supplies the generated control signal Ctr2 to the touch panel 8. Meanwhile, the input acceptance unit 18 obtains contact information DT from the touch panel 8. Here, the contact information DT indicates a position of contact of a finger or an object such as a pen with the touch panel 8. Note that the present embodiment assumes a case where the touch panel 8 is a capacitive touch panel.

Figure 4:
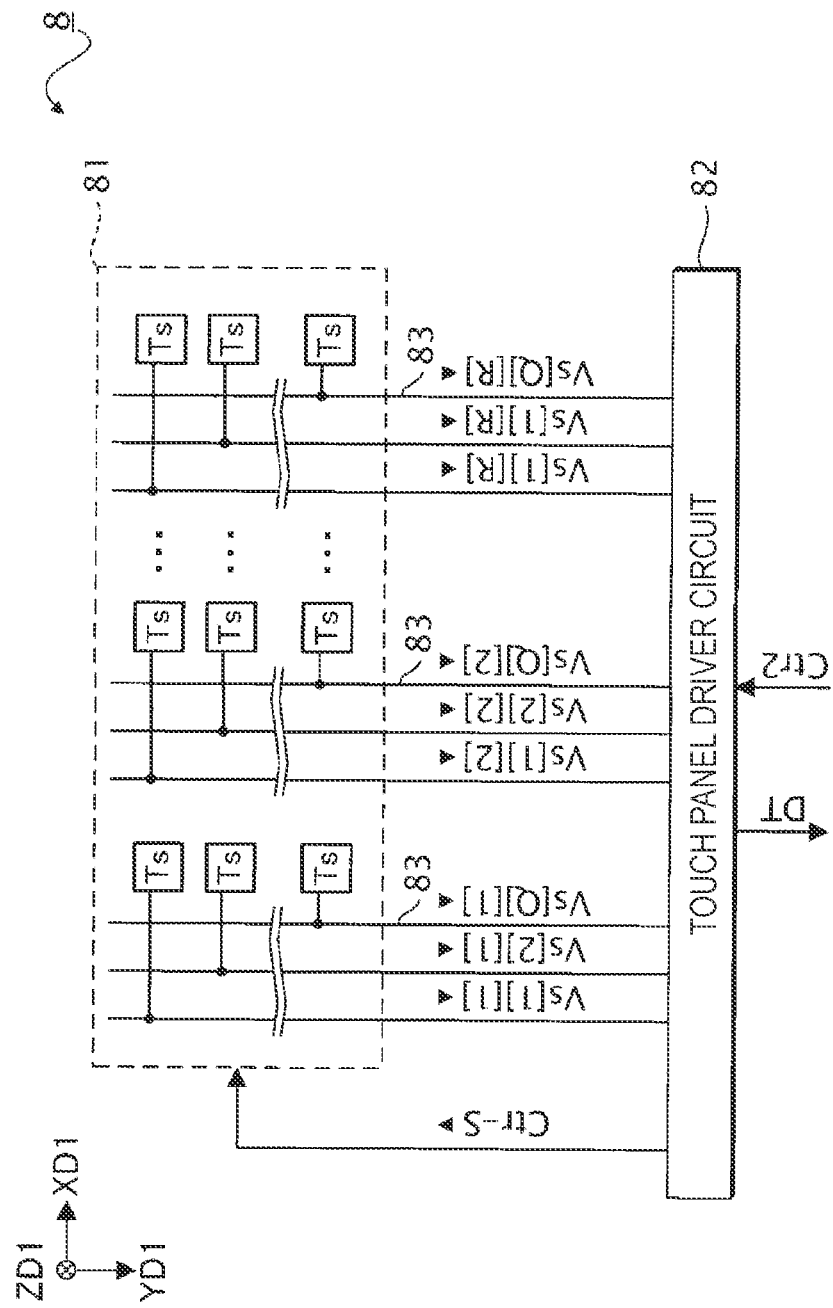
FIG. 4 is a block diagram illustrating an example of a configuration of a touch panel.

FIG. 4 is a block diagram illustrating an example of a configuration of the touch panel 8.

As illustrated in FIG. 4, the touch panel 8 is provided with a sensor group 81 including (Q×R) touch sensors Ts arranged in a matrix of Q rows in the YD1 direction and R columns in the XD1 direction, a touch panel driver circuit 82 that drives the (Q×R) touch sensors Ts, and (Q×R) detection lines 83 corresponding one-to-one to the (Q×R) touch sensors Ts. Note that the present embodiment assumes a case where the value Q and the value R are natural numbers that satisfy $Q \geq 2$, $R \geq 2$, and $(Q \times R) \geq 600$. In other words, the touch panel 8 includes 600 or more touch sensors Ts in the present embodiment.

Each touch sensor Ts includes a capacitive element. Moreover, electric potentials at two electrodes included in the capacitive element provided to the touch sensor Ts vary when an object comes into contact with the touch sensor Ts.

The touch panel driver circuit 82 generates a control signal Ctr-S based on the control signal Ctr2, and outputs the generated control signal Ctr-S to the sensor group 81. Here, the control signal Ctr-S is a signal to instruct output of a detection signal Vs[q][r], which indicates the electric potential of an electrode out of two electrodes provided to a touch sensor Ts[q][r] on a q-th row and an r-th column, to the detection line 83 provided corresponding to the touch sensor Ts. Here, the parameter q is a natural number that satisfies $1 \leq q \leq Q$ and the parameter r is a natural number that satisfies $1 \leq r \leq R$. Thus, the touch panel driver circuit 82 can receive supply of (Q×R) detection signals Vs from the (Q×R) touch sensors Ts. Then, the touch panel driver circuit 82 generates the contact information DT indicating the position of contact of the object with the touch panel 8 based on the (Q×R) detection signals Vs, and outputs the generated contact information DT to the controlling unit 1.

The present embodiment assumes a case in which an area where the (Q×R) touch sensors Ts provided to the touch panel 8 are deployed is included in an area where the (M×N) pixels Px provided to the display unit 7 are deployed in plan view of the interface unit 6 in the ZD1 direction. Accordingly, in the present embodiment, the operator of the printing apparatus 100 can touch the touch panel 8 with a sense of touching the display unit 7. In other words, in the present embodiment, the operator of the printing apparatus 100 can input a command to the touch panel 8 with a sense of touching the display unit 7.

The present embodiment assumes the case in which the area where the (Q×R) touch sensors Ts provided to the touch panel 8 are deployed is included in the area where the (M×N) pixels Px provided to the display unit 7 are deployed in plan view of the interface unit 6 in the ZD1 direction. However, the present disclosure is not limited only to this configuration. The area where the (Q×R) touch sensors Ts provided to the touch panel 8 are deployed may be substantially the same area as the area where the (M×N) pixels Px provided to the display unit 7 are deployed in plan view of the interface unit 6 in the ZD1 direction. Here, the expression "substantially the same" is a concept that encompasses a case of being identifiable as the same while taking into account a certain error and a case of being the same from the design perspective in addition to the case of being exactly the same. In the present embodiment, the "error" is an allowance equal to or below 10%, for example.

Next, a description will be given of transportation of the print paper PP by the transportation unit 4.

Figure 5:
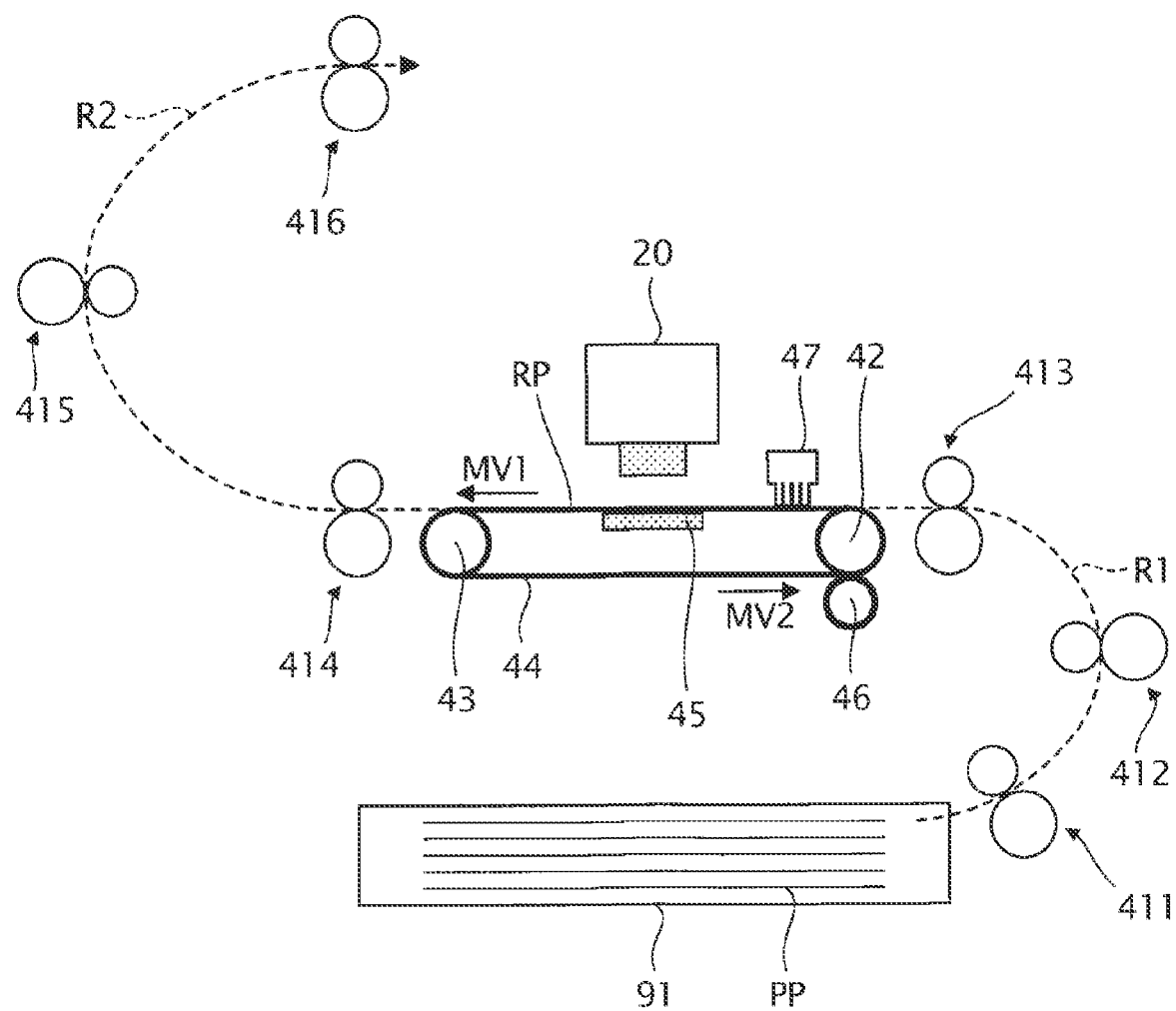
FIG. 5 is a diagram illustrating an example of a configuration of a transportation unit.

FIG. 5 is a schematic cross-sectional view of the printing apparatus 100 for explaining an example of a configuration of the transportation unit 4.

As illustrated in FIG. 5, the transportation unit 4 supplies the print paper PP to the printing unit 2 by transporting the print paper PP contained in the container cassette 91 along a supply route R1.

Next, the transportation unit 4 transports the print paper PP along a printing route RP provided to the printing unit 2. Then, the printing unit 2 forms the printed image PPT on the print paper PP being transported on the printing route RP. To be more precise, the printing unit 2 includes a head unit 20 that ejects the ink, and the head unit 20 forms the printed image PPT on the print paper PP by ejecting the ink onto the print paper PP being transported on the printing route RP.

Thereafter, the transportation unit 4 transports the print paper PP, on which the printed image PPT is formed, along a discharge route R2, thereby discharging the print paper PP to the discharge tray 401.

There are provided transportation roller pairs on the supply route R1, which include a transportation roller pair 411, a transportation roller pair 412, and a transportation roller pair 413. The print paper PP contained in the container cassette 91 is transported to the printing route RP by using the transportation roller pairs that are provided on the supply route R1.

The printing route RP is a route to transport the print paper PP when the printing unit 2 forms the printed image PPT on the print paper PP, which is a route defined by a transportation belt 44. Here, the transportation belt 44 is an endless belt that is rotationally driven between a driving pulley 42 and a driven pulley 43. To be more precise, the transportation belt 44 is rotationally driven by the driving pulley 42 such that its upper side portion located in Z1 direction relative to the driving pulley 42 and the driven pulley 43 moves in X2 direction as indicated with an arrow MV1 in FIG. 5, and that its lower side portion located in z2 direction relative to the driving pulley 42 and the driven pulley 43 moves in X1 direction as indicated with an arrow MV2 in FIG. 5. In the present embodiment, the driving pulley 42 is provided at a position closer to the supply route R1 out of the printing route RP than the head unit 20 is. A support plate 45 to support the upper side portion of the transportation belt 44 is provided on an inner side of the transportation belt 44.

As illustrated in FIG. 5, a charge roller 46 is provided in the vicinity of the printing route RP in such a way as to come into contact with an outer surface of the transportation belt 44. Here, the charge roller 46 is an example of a "charge processing unit". In the present embodiment, the charge roller 46 is provided at a position closer to the supply route R1 out of the printing route RP than a position opposed to the head unit 20. To be more precise, in the present embodiment, the charge roller 46 is provided in such a way as to pinch the transportation belt 44 between the driving pulley 42 and the charge roller 46.

The charge roller 46 is charged by the power supply unit 5, thereby supplying electric charges of a predetermined polarity to the transportation belt 44. Meanwhile, when the print paper PP is transported by the transportation belt 44, the print paper PP is adsorbed onto the transportation belt 44 by means of the electric charges of the predetermined polarity that are charged on the transportation belt 44. Here, an anti-static brush 47 for removing the electric charges that are charged on a surface of the print paper PP transported on the printing route RP, which is the surface on the opposite side from the surface in contact with the transportation belt 44, is provided at a section of the printing route RP between the driving pulley 42 and the head unit 20.

There are provided transportation roller pairs on the discharge route R2, which include a transportation roller pair 414, a transportation roller pair 415, and a transportation roller pair 416. The print paper PP transported on the printing route RP is discharged to the discharge tray 401 by using the transportation roller pairs that are provided on the discharge route R2.

2. Input of Command to Interface Unit

A description will be given below of the input of a command by using the interface unit 6 with reference to FIGS. 6 to 12.

FIG. 6 is a diagram illustrating an example of a main menu screen G0, which is displayed on the display unit 7 included in the interface unit 6.

As illustrated in FIG. 6, the main menu screen G0 includes a copy button B01, a scan button B02, and an administrator menu button B03, for example. Here, the main menu screen G0 is a screen to be displayed on the display unit 7 in the first place when the printing apparatus 100 is powered on, for instance.

In the present embodiment, the printing apparatus 100 is operated in the general operation mode when the printing apparatus 100 is powered on and the main menu screen G0 is displayed on the display unit 7.

The operator of the printing apparatus 100 can cause the printing apparatus 100 to execute copy processing by touching a portion of the touch panel 8 corresponding to the copy button B01 on the display unit 7. The operator of the printing apparatus 100 can also cause the printing apparatus 100 to execute scan processing by touching a portion of the touch panel 8 corresponding to the scan button B02 on the display unit 7. Here, the scan processing is processing to read an image formed on any of the print paper PP and other media and to generate scanned image information DS that indicates a scanned image PPS being the read image. Meanwhile, the copy processing is processing that includes the scan processing to generate the scanned image information DS and the print processing to form the scanned image PPS, which is indicated by the scanned image information DS generated in the scan processing, on the print paper PP as the printed image PPT.

In the present embodiment, the copy processing is another example of the "image formation processing". Specifically, in the present embodiment, the touch on the copy button B01 by the operator of the printing apparatus 100 is a command to cause the printing apparatus 100 to execute the copy processing, which is another example of the "first instruction".

When the administrator menu button B03 is touched on the main menu screen G0, the controlling unit 1 displays an administrator log-in screen GP1 on the display unit 7. The administrator log-in screen GP1 is a screen used for performing log-in processing to allow the administrator of the printing apparatus 100 to log in to the management operation mode.

When the log-in of the administrator of the printing apparatus 100 to the management operation mode is successful in the log-in processing, the controlling unit 1 changes the operation mode of the printing apparatus 100 from the general operation mode to the management operation mode, and also displays an administrator menu screen GK on the display unit 7. When the administrator menu screen GK is displayed on the display unit 7, the administrator of the printing apparatus 100 can input a command concerning the management operation of the printing apparatus 100 with the touch panel 8.

In the present embodiment, examples of the command concerning the management operation of the printing apparatus 100 include a command to cause the printing unit 2 to execute maintenance processing, a command to cause the printing unit 2 to execute maintenance permission processing, and the like.

Here, the maintenance processing is an example of "processing concerning maintenance", which is processing to conduct maintenance of the printing unit 2.

Meanwhile, the maintenance permission processing is another example of the "processing concerning maintenance", which is processing to change a condition of the printing unit 2 so as to enable maintenance work by the administrator of the printing apparatus 100. To be more precise, examples of the maintenance permission processing include processing to move the head unit 20 to a position accessible to the administrator so as to enable maintenance work on the head unit 20 by the administrator, processing to open a lid of a housing of the printing apparatus 100 containing the head unit 20 so as to enable the maintenance work on the head unit 20 by the administrator, and so forth.

In the present embodiment, the above-described log-in processing is an example of "maintenance permission processing".

Figure 7:
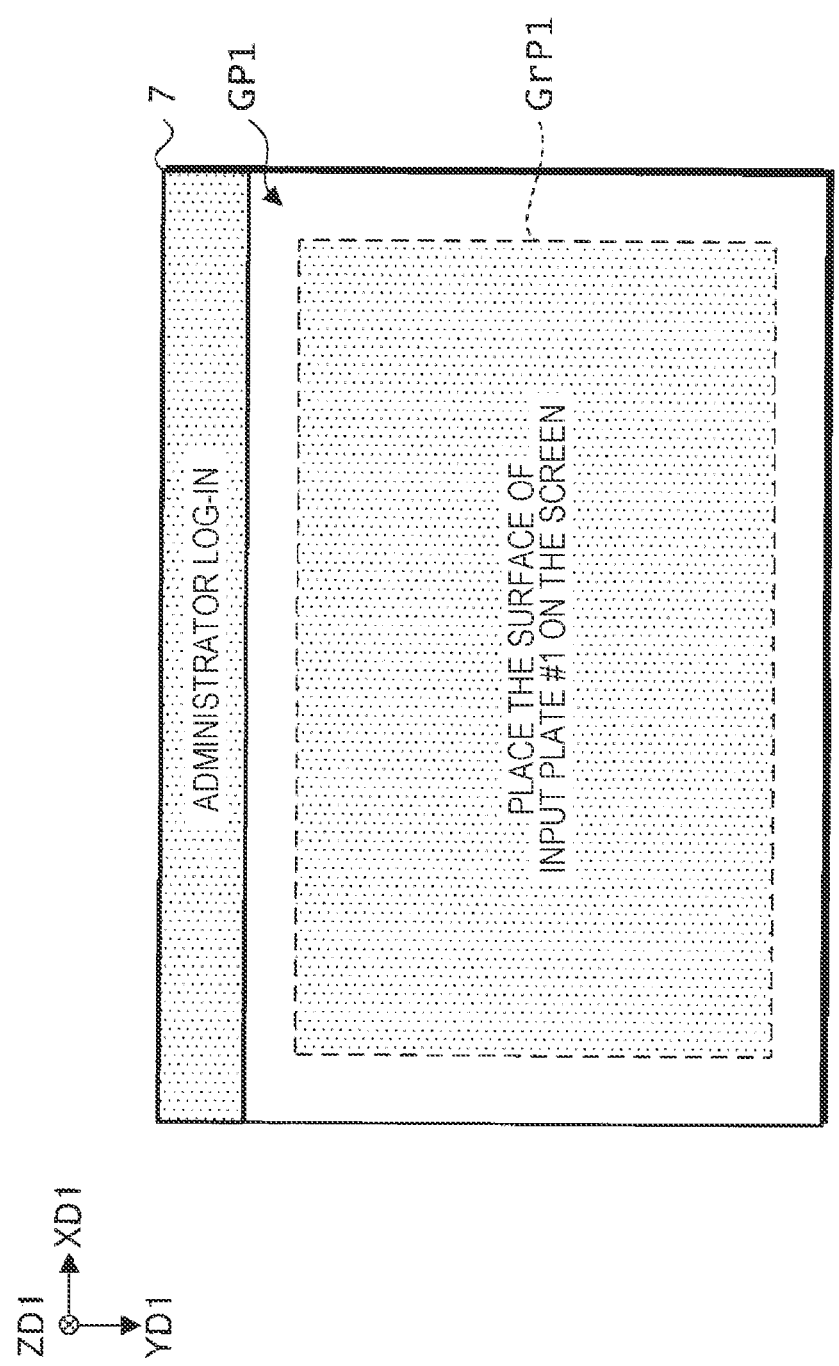
FIG. 7 is a diagram illustrating an example of an administrator log-in screen.

FIG. 7 is a diagram illustrating an example of the administrator log-in screen GP1 displayed on the display unit 7.

As illustrated in FIG. 7, the administrator log-in screen GP1 includes an input acceptance area image Grp1 that indicates an input acceptance area Arp1 on the touch panel 8. Here, the input acceptance area Arp1 is an area on the touch panel 8 for accepting the input of the command from the administrator of the printing apparatus 100 when the administrator log-in screen GP1 is displayed on the display unit 7. In the present embodiment, besides the input of the command to the touch panel 8 by touching the touch panel 8 with fingers of the operator of the printing apparatus 100, it is also possible to input the command to the touch panel 8 by means of contact with the touch panel 8 using a command input plate PL1 to be described later.

Figure 8:
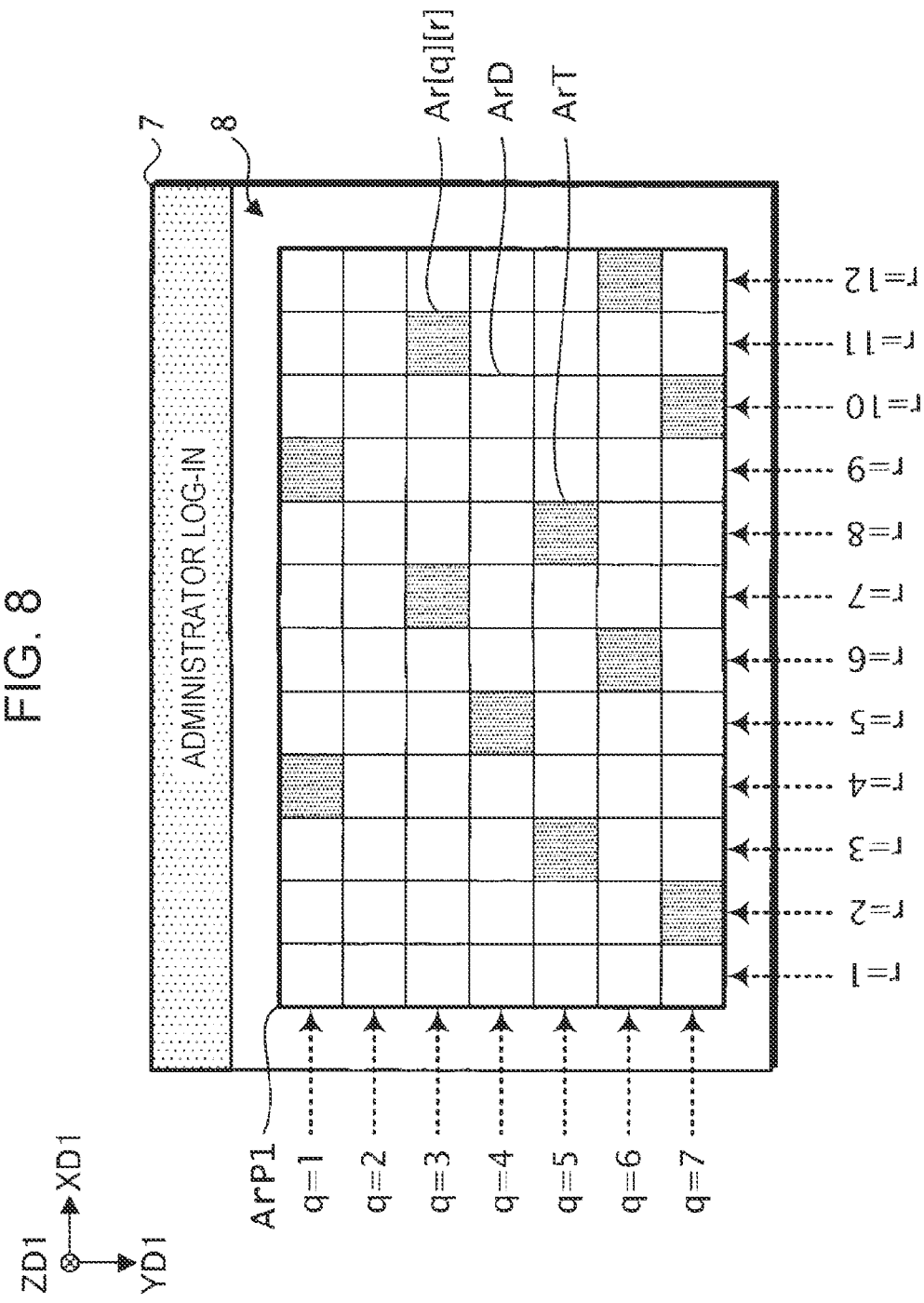
FIG. 8 is a diagram illustrating an example of an input acceptance area.

FIG. 8 is an explanatory diagram for explaining an example of the input acceptance area Arp1 on the touch panel 8.

As illustrated in FIG. 8, the touch panel 8 according to the present embodiment includes (Q×R) detection areas Ar in the input acceptance area Arp1, which correspond to the (Q×R) touch sensors Ts. To be more precise, the touch panel 8 includes the (Q×R) detection areas Ar in the input acceptance area Arp1, which are arranged in a matrix of Q rows in the YD1 direction and R columns in the XD1 direction. A detection area Ar on the q-th row and the r-th column out of the (Q×R) detection areas Ar may be hereinafter referred to as a detection area Ar[q][r] as appropriate.

As described above, the value Q and the value R are the natural numbers that satisfy (Q×R)≥600. In other words, the touch panel 8 includes 600 or more detection areas Ar in the present embodiment. Here, the 600 or more detection areas Ar are an example of "six hundred or more detection points".

The present embodiment will describe an example in which the touch panel 8 is configured to be provided with one touch sensor Ts corresponding to each detection area Ar. However, the present disclosure is not limited only to this configuration. For example, the touch panel 8 may be configured to be provided with two or more touch sensors Ts corresponding to each detection area Ar. In this case, the touch panel 8 preferably includes 1200 or more touch sensors Ts.

Moreover, the present embodiment will describe an example in which the input acceptance area Arp1 and an area where the input acceptance area image Grp1 is present are each equivalent to a partial area of the display unit 7. However, the present disclosure is not limited only to this configuration. For example, the input acceptance area Arp1 and the area where the input acceptance area image Grp1 is present may be substantially the same as an area where the display unit 7 is present in plan view of the display unit 7.

FIG. 8 illustrates an example in which the value Q is "7" and the value R is "12", or in other words, the example in which the touch panel 8 is provided with 84 detection areas Ar. However, this arrangement is made solely for the convenience of illustration and the touch panel 8 according to the present embodiment is supposed to include the 600 or more detection areas Ar in reality as mentioned earlier.

As illustrated in FIG. 8, eleven or more contact required areas ArT and one or more contact prohibited areas ArD are provided in the input acceptance area Arp1 included in the touch panel 8. Note that the eleven or more contact required areas ArT provided in the input acceptance area Arp1 are an example of "eleven or more first detection points" and the one or more contact prohibited areas ArD provided in the input acceptance area Arp1 are an example of "one or more second detection points".

The present embodiments assume an example in which eleven contact required areas ArT and (Q×R−11) contact prohibited areas ArD are provided in the input acceptance area Arp1 on the touch panel 8.

Here, FIG. 8 illustrates the example in which a detection area Ar[1][4], a detection area Ar[1][9], a detection area Ar[3][7], a detection area Ar[3][11], a detection area Ar[4][5], a detection area Ar[5][3], a detection area Ar[5][8], a detection area Ar[6][6], a detection area Ar[6][12], a detection area Ar[7][2], and a detection area Ar[7] among the detection areas Ar provided to the touch panel 8 are the contact required areas ArT and the rest of the detection areas Ar are the contact prohibited areas ArD.

In the present embodiment, the eleven contact required areas ArT are provided in the input acceptance area Arp1 included in the touch panel 8 in such a way as not to be adjacent to one another. In other words, in the input acceptance area Arp1 included in the touch panel 8 of the present embodiment, each detection area Ar adjacent to the contact required area ArT is the contact prohibited area ArD.

In the present embodiment, a detection area Ar adjacent to a certain detection area Ar means a detection area Ar that is adjacent to the certain detection area Ar in the XD axis direction or the YD axis direction. That is to say, in the present embodiment, a detection area Ar adjacent to a detection area Ar[q][r] is any of a detection area Ar[q+1][r], a detection area Ar[q][r+1], a detection area Ar[q−1][r], and a detection area Ar[q][r−1]. Nevertheless, the detection area Ar adjacent to the detection area Ar[q][r] may also include any of a detection area Ar[q+1][r+1], a detection area Ar[q−1][r+1], a detection area Ar[q−1][r+1], and a detection area Ar[q−1][r−1]. In this paragraph, the parameter q is assumed to be a natural number that satisfies 2≤q≤(Q−1) and the parameter r is assumed to be a natural number that satisfies 2≤r≤(R−1).

In the present embodiment, the controlling unit 1 permits the administrator of the printing apparatus 100 to log in to the management operation mode in the course of the log-in processing when all the eleven contact required areas ArT provided in the input acceptance area Arp1 detect the contact and when all the (Q×R−11) contact prohibited areas ArD provided in the input acceptance area Arp1 do not detect the contact. In other words, the controlling unit 1 does not permit the administrator of the printing apparatus 100 to log in to the management operation mode in the course of the log-in processing when one or more contact required areas ArT out of the eleven contact required areas ArT do not detect the contact or when one or more contact prohibited areas ArD out of the (Q×R−11) contact prohibited areas ArD detect the contact.

In general, the operator of the printing apparatus 100 has ten fingers. On the other hand, there are eleven or more contact required areas ArT that the operator of the printing apparatus 100 is supposed to touch in the course of the log-in processing. Accordingly, the operator printing apparatus 100 may not be able to touch all the contact required areas ArT in the course of the log-in processing.

In the meantime, in the present embodiment, the detection area Ar adjacent to the contact required area ArT supposed to be touched by the operator of the printing apparatus 100 is the contact prohibited area ArD that the operator of the printing apparatus 100 is prohibited to touch. For this reason, when the operator of the printing apparatus 100 forces himself to touch the eleven or more contact required area ArT, he may touch the contact prohibited area ArD adjacent to the contact required area ArT by mistake.

Given the circumstances, the operator of the printing apparatus 100 touches the eleven or more contact required areas ArT by using the command input plate PL1 in this embodiment.

Figure 9:
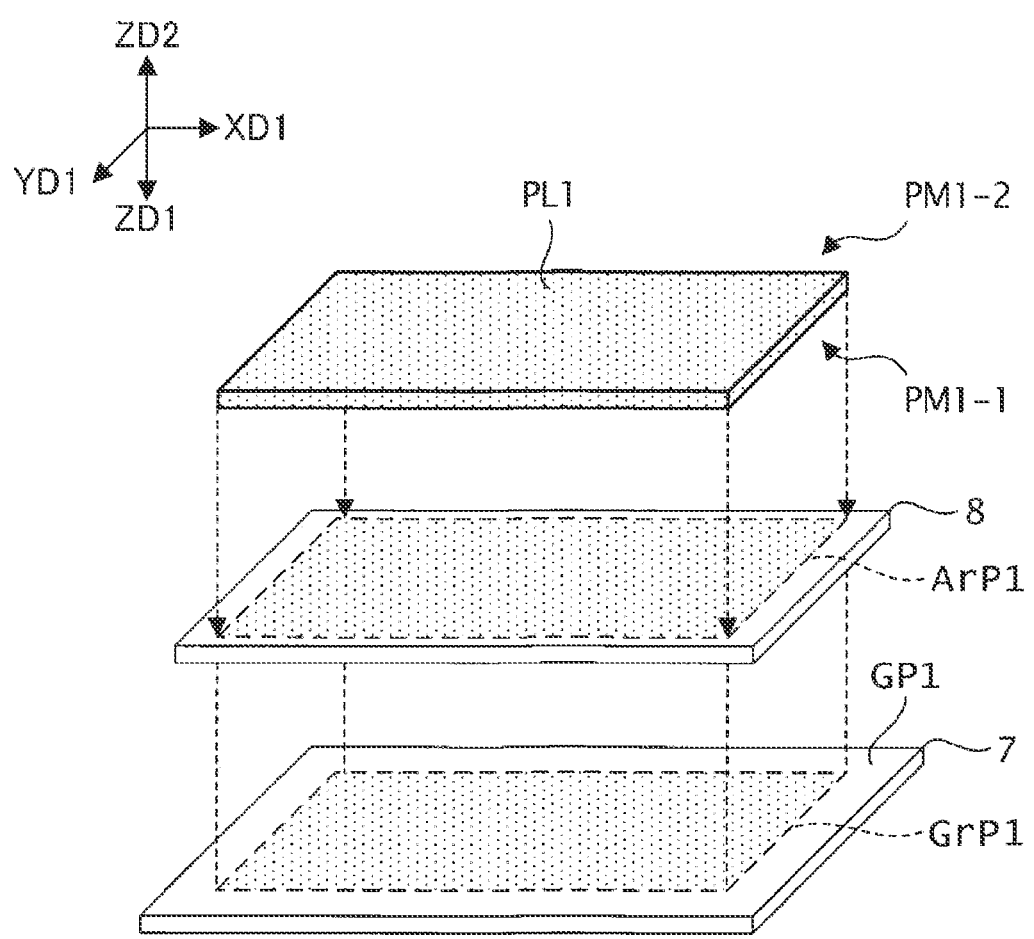
FIG. 9 is a perspective view illustrating an example of a command input plate.

FIG. 9 is a perspective view for explaining an outline of the command input plate PL1.

As illustrated in FIG. 9, the command input plate PL1 includes a contact surface PM1-1 and a rear surface PM1-2 on an opposite side of the contact surface PM1-1. In the present embodiment, the administrator of the printing apparatus 100 inputs the command to the touch panel 8 by bringing the contact surface PM1-1 of the command input plate PL1 into contact with the input acceptance area Arp1 on the touch panel 8. Note that the command input plate PL1 is an example of a "jig" in the present embodiment. Meanwhile, the contact surface PM1-1 is an example of a "first surface" in the present embodiment. Moreover, the command input plate PL1 and the input acceptance area Arp1 have substantially the same size in the present embodiment.

Figure 10:
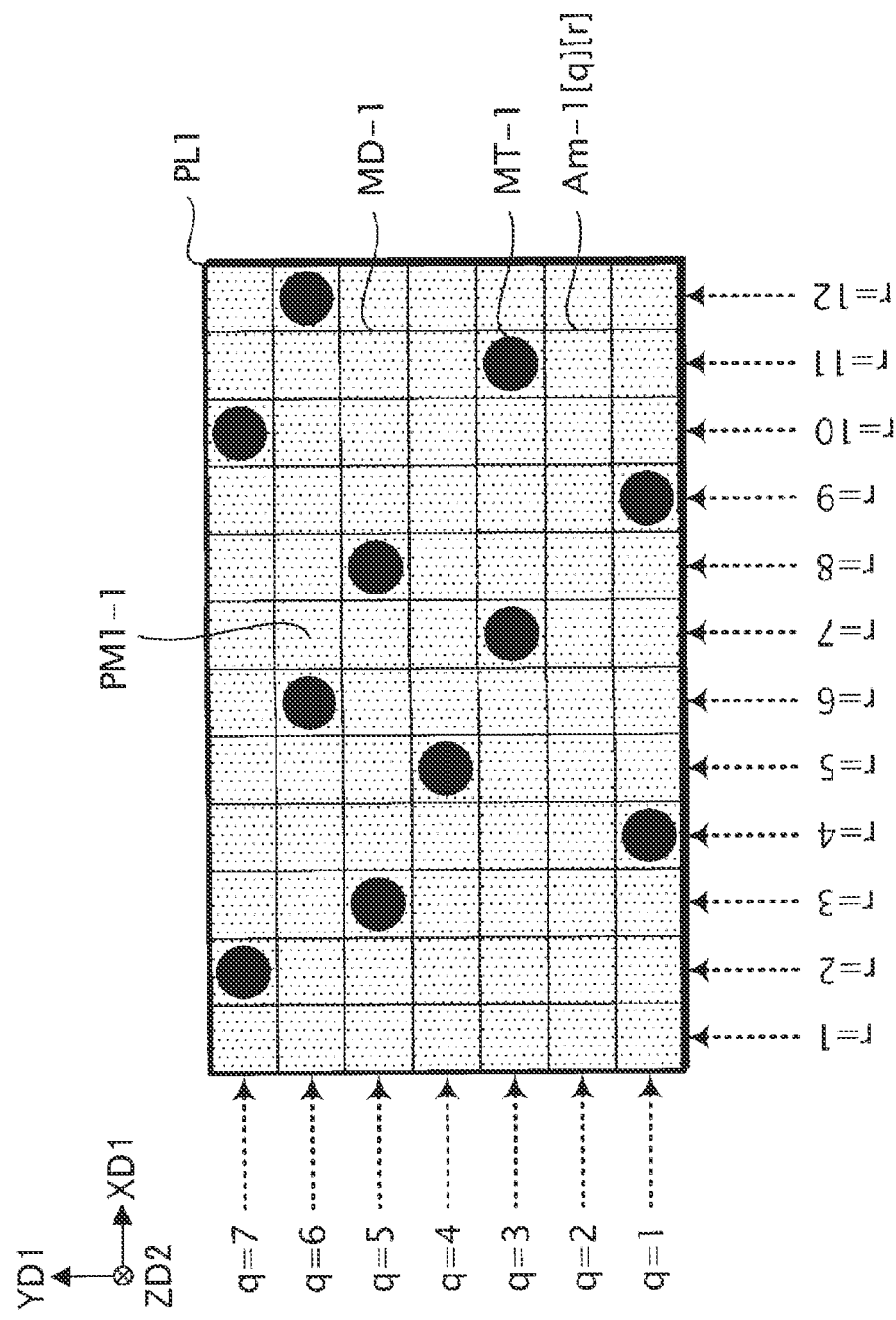
FIG. 10 is a plan view illustrating an example of a contact surface of the command input plate.

FIG. 10 is a plan view illustrating the contact surface PM1-1 of the command input plate PL1. Note that FIG. 10 is a plan view of the contact surface PM1-1 of the command input plate PL1 in the ZD2 direction when the contact surface PM1-1 of the command input plate PL1 is in contact with the touch panel 8.

As illustrated in FIG. 10, the contact surface PM1-1 includes partial areas Am-1 corresponding one-to-one to the detection areas Ar provided in the input acceptance area Arp1. As discussed earlier, in the present embodiment, the input acceptance area Arp1 includes the (Q×R) detection areas Ar arranged in the Q rows in the YD axis direction and the R columns in the XD axis direction. In the present embodiment, the contact surface PM1-1 is also provided with the (Q×R) partial area Am-1 arranged in the Q rows in the YD axis direction and the R columns in the XD axis direction. A partial area Am-1 on the q-th row and the r-th column out of the (Q×R) partial areas Am-1 may be hereinafter referred to as a partial area Am-1[q][r] as appropriate.

Moreover, in the present embodiment, the contact surface PM1-1 is provided with eleven or more contact corresponding areas MT-1 that correspond one-to-one to the eleven or more contact required areas ArT provided in the input acceptance area Arp1, and one or more prohibition corresponding areas MD-1 that correspond one-to-one to the one or more contact prohibited areas ArD provided in the input acceptance area Arp1. To be more precise, the contact surface PM1-1 is provided with the eleven or more contact corresponding areas MT-1 in such a way that all the eleven or more contact required areas ArT provided in the input acceptance area Arp1 come into contact with the eleven or more contact corresponding area MT-1 provided on the contact surface PM1-1, respectively, when the contact surface PM1-1 is brought into contact with the input acceptance area Arp1.

Here, the eleven or more contact corresponding areas MT-1 are an example of "eleven or more first contact points".

Figure 11:
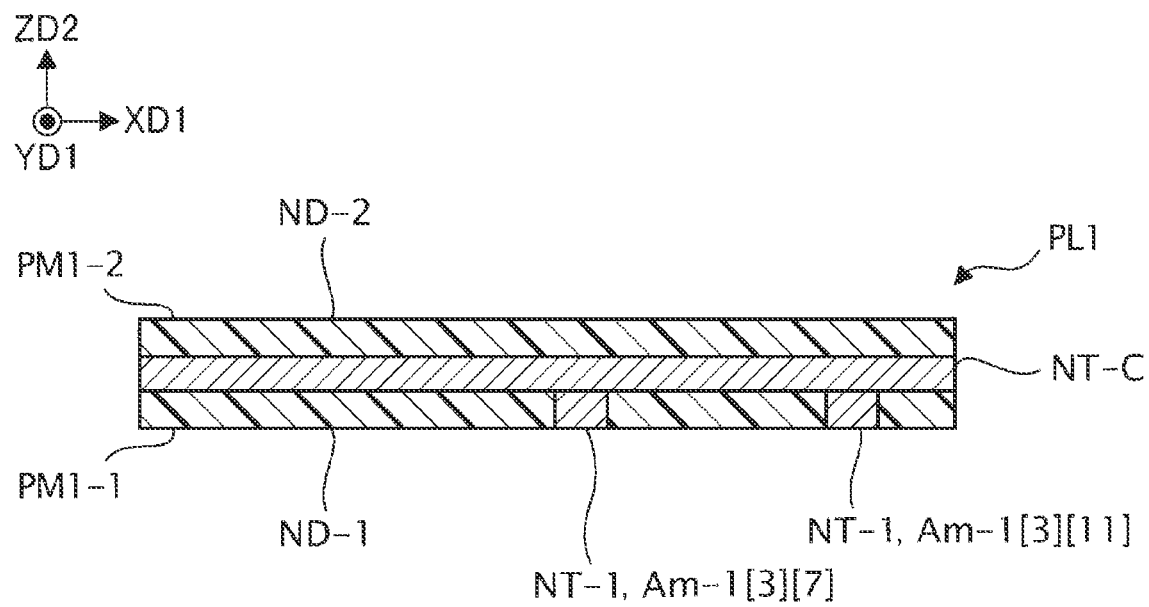
FIG. 11 is a cross-sectional view illustrating the example of the command input plate.

FIG. 11 is a cross-sectional view of the command input plate PL1, which is taken along a plane perpendicular to the contact surface PM1-1. To be more precise, FIG. 11 is the cross-sectional view of the command input plate PL1 illustrated in FIG. 10, which is taken along the plane that passes through the column "r=3" in FIG. 10 and is perpendicular to the contact surface PM1-1.

As illustrated in FIG. 11, the command input plate PL1 includes a conductive portion NT-C provided between the contact surface PM1-1 and the rear surface PM1-2, a non-conductive portion ND-1 provided between the conductive portion NT-C and the contact surface PM1-1, a non-conductive portion ND-2 provided between the conductive portion NT-C and the rear surface PM1-2, and conductive portions NT-1 provided between the conductive portion NT-C and the contact surface PM1-1. Here, the conductive portion NT-C is formed from a conductive material such as a metal, and is set to a predetermined potential such as a ground potential. In the present embodiment, the ground potential is an example of a "predetermined contact potential". Meanwhile, the conductive portions NT-1 are formed from a conductive material such as a metal, and are electrically coupled to the conductive portion NT-C. On the other hand, the non-conductive portion ND-1 and the non-conductive portion ND-2 are formed from a non-conductive material such as a resin.

In the present embodiment, the conductive portions NT-1 are provided in the contact corresponding area MT-1. Meanwhile, in the present embodiment, the non-conductive portion ND-1 is provided in the prohibition corresponding areas MD-1. Accordingly, in the present embodiment, the touch panel 8 detects the contact of the contact corresponding area MT-1 provided on the contact surface PM1-1 with the contact required area ArT provided in the input acceptance area Arp1 when the contact surface PM1-1 of the command input plate PL1 is brought into contact with the input acceptance area Arp1 on the touch panel 8. In the meantime, the touch panel 8 does not detect the contact from the contact prohibited area ArD in the input acceptance area Arp1, which comes into contact with the prohibition corresponding area MD-1 provided on the contact surface PM1-1, when the contact surface PM1-1 of the command input plate PL1 is brought into contact with the input acceptance area Arp1 on the touch panel 8.

Figure 12:
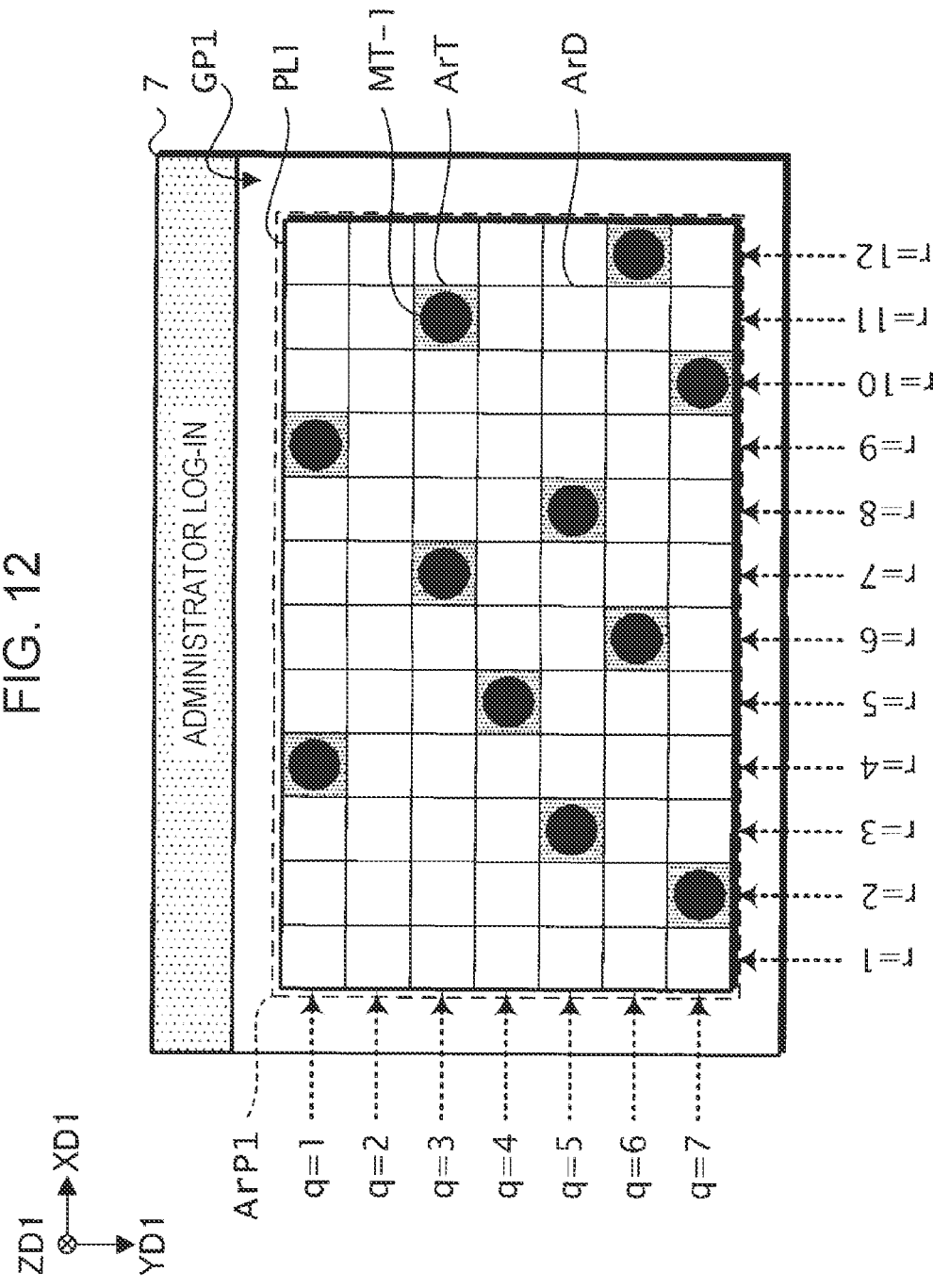
FIG. 12 is a diagram illustrating an example of a relation between the command input plate and the input acceptance area.

FIG. 12 is a plan view of the command input plate PL1 and the touch panel 8 in the Z1 direction when the contact surface PM1-1 of the command input plate PL1 illustrated in FIGS. 10 and 11 comes into contact with the touch panel 8.

As illustrated in FIG. 12, when the contact surface PM1-1 is brought into contact with the input acceptance area Arp1, the eleven contact corresponding areas MT-1 provided to the command input plate PL1 come into contact with the eleven contact required areas ArT provided to the touch panel 8, respectively. Meanwhile, when the contact surface PM1-1 is brought into contact with the input acceptance area Arp1, the (Q×R−11) prohibition corresponding areas MD-1 provided to the command input plate PL1 come into contact with the (Q×R−11) contact prohibited areas ArD provided to the touch panel 8, respectively. As a consequence, in the present embodiment, the touch panel 8 detects the contact with all the eleven contact required areas ArT but does not detect the contact with all the (Q×R−11) contact prohibited areas ArD.

Note that FIGS. 10 to 12 illustrate the example in which a partial area Am-1[1][4], a partial area Am-1[1][9], a partial area Am-1[3][7], a partial area Am-1[3][11], a partial area Am-1[4][5], a partial area Am-1[5][3], a partial area Am-1[5][8], a partial area Am-1[6][6], a partial area Am-1[6][12], a partial area Am-1[7][2], and a partial area Am-1[7] out of the partial areas Am-1 provided to the command input plate PL1 are the contact corresponding areas MT-1 provided with the conductive portions NT-1, and the rest of the partial areas Am-1 are the prohibition corresponding areas MD-1 provided with the non-conductive portion ND-1. As a consequence, when the contact surface PM1-1 of the command input plate PL1 comes into contact with the touch panel 8, the eleven contact corresponding areas MT-1 come into contact with the eleven contact required areas ArT, respectively as illustrated in FIG. 12.

The processing conducted by the printing apparatus 100 to detect the contact with the contact required areas ArT by bringing the command input plate PL1 into contact with the touch panel 8 without detecting the contact with the contact prohibited areas ArD will be hereinafter referred to as command acceptance processing.

3. Command Acceptance Processing

The command acceptance processing will be described below with reference to FIG. 13.

Figure 13:
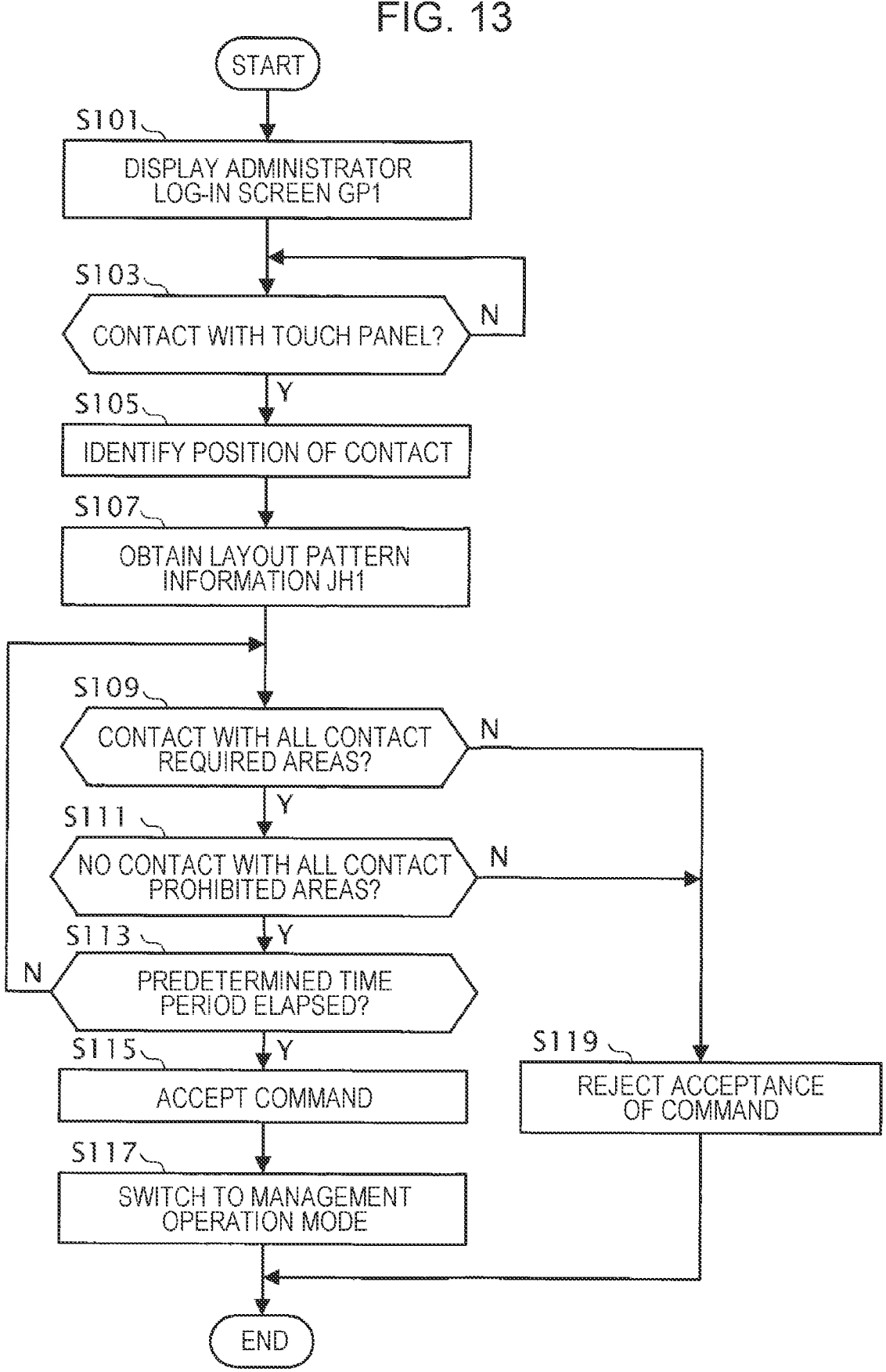
FIG. 13 is a flowchart illustrating an example of command acceptance processing.

FIG. 13 is a flowchart illustrating an operation by the printing apparatus 100 when the printing apparatus 100 executes the command acceptance processing.

In the present embodiment, the command acceptance processing illustrated in FIG. 13 is started when the administrator menu button B03 is touched on the main menu screen G0. However, the present disclosure is not limited only to this configuration. For example, the command acceptance processing may be started upon input of a command concerning the management operation of the printing apparatus 100 with the touch panel 8, such as input of a command to execute the maintenance permission processing as typified by a command to execute the log-in processing.

As illustrated in FIG. 13, when the command acceptance processing is started, the display control unit 17 causes the display unit 7 to display the administrator log-in screen GP1 (S101).

Next, the input acceptance unit 18 determines based on the contact information DT as to whether or not there is the contact with the touch panel 8 (S103).

The input acceptance unit 18 moves the processing to step S103 when a result of determination in step S103 is negative.

When the result of determination in step S103 is affirmative, the input acceptance unit 18 obtains the contact information DT provided from the touch panel 8, and identifies a position of contact of an object with the touch panel 8 based on the obtained contact information DT (S105).

The present embodiment assumes that the storage unit 10 stores layout pattern information JH1. The layout pattern information JH1 is information indicating a layout pattern of the eleven or more contact required areas ArT in the input acceptance area Arp1. To be more precise, the layout pattern information JH1 may be information indicating the numbers of rows q and columns r of the detection areas Ar[q][r] defined as the contact required areas ArT, for example.

Then, in the command acceptance processing according to the present embodiment, the input acceptance unit 18 obtains the layout pattern information JH1 from the storage unit 10 (S107).

Next, the input acceptance unit 18 determines based on the contact information DT obtained in step S105 that there is the contact with all the contact required areas ArT indicated in the layout pattern information JH1 that is obtained in step S107 (S109).

The input acceptance unit 18 moves the processing to step S119 when a result of determination in step S109 is negative.

When the result of determination in step S109 is affirmative, the input acceptance unit 18 determines based on the contact information DT obtained in step S105 that there is no contact with all the contact prohibited areas ArD identified based on the layout pattern information JH1 that is obtained in step S107 (S111).

The input acceptance unit 18 moves the processing to step S119 when a result of determination in step S111 is negative.

When the result of determination in step S111 is affirmative, a determination is made as to whether or not a predetermined time period has elapsed since the timing of determination that the contact with the touch panel 8 was detected in step S103 (S113).

The input acceptance unit 18 moves the processing to step S109 when a result of determination in step S113 is negative.

When the result of determination in step S113 is affirmative, the input acceptance unit 18 accepts the command corresponding to the command input plate PL1, that is, the command to allow the administrator of the printing apparatus 100 to log in to the management operation mode (S115).

Then, the mode control unit 19 switches the operation mode of the printing apparatus 100 from the general operation mode to the management operation mode (S117), and terminates the command acceptance processing illustrated in FIG. 13.

On the other hand, when the results of determination in steps S109 and S111 are negative, the input acceptance unit 18 rejects acceptance of the command corresponding to the command input plate PL1 (S119), and terminates the command acceptance processing illustrated in FIG. 13.

The present embodiment has described the example in which there was only one type of the command input plate PL1 to come into contact with the touch panel 8 and there was only one type of the layout pattern provided to the command input plate PL1 for the convenience of explanation. However, the present disclosure is not limited only to this configuration. For example, there may be two or more types of the command input plates PL1 to come into contact with the touch panel 8. In other words, there may be two or more types of the layout patterns provided to the command input plates PL1. In this case, the printing apparatus 100 only needs to store two or more pieces of the layout pattern information JH1 corresponding to the aforementioned layout patterns in the storage unit 10. Moreover, in this case, the controlling unit 1 may obtain plate identification information or pattern identification information from the command input plate PL1 in step S103 and the like. Here, the plate identification information may indicate the type of the command input plate PL1 that comes into contact with the touch panel 8, and the pattern identification information may indicate the type of the layout pattern provided to the command input plate PL1 that comes into contact with the touch panel 8. Furthermore, in this case, the controlling unit 1 may obtain the layout pattern information JH1, which corresponds to the plate identification information or the pattern identification information obtained in step S103 and the like, from the storage unit 10 in step S107 and the like.

4. Conclusion of Embodiment

As described above, the printing apparatus 100 according to the present embodiment includes the printing unit 2 that executes the print processing to form the printed image PPT on the print paper PP, the controlling unit 1 that controls the printing unit 2, and the interface unit 6 including the display unit 7 that displays information to the operator of the printing apparatus 100 and the capacitive touch panel 8 that accepts the command from the operator of the printing apparatus 100. Here, the touch panel 8 includes the 600 or more detection areas Ar provided with the eleven or more contact required areas ArT and the one or more contact prohibited areas ArD. The controlling unit 1 can control the printing unit 2 in accordance with the operation modes including the general operation mode of accepting the command from the touch panel 8 concerning the print processing to cause the printing unit 2 to execute the print processing and of restricting acceptance of the command from the touch panel 8 concerning the management operation of the printing apparatus 100 to cause the printing unit 2 to execute the maintenance permission processing, and the management operation mode of accepting the command from the touch panel 8 concerning the management operation of the printing apparatus 100. On the condition that the controlling unit 1 controls the printing unit 2 in accordance with the general operation mode, the controlling unit 1 permits switching of the operation mode from the general operation mode to the management operation mode when the contact with the eleven or more contact required areas ArT is detected and when the contact with the one or more contact prohibited areas ArD is not detected.

In other words, in the present embodiment, the controlling unit 1 permits the switching from the general operation mode to the management operation mode when there is the contact with the eleven or more contact required areas ArT provided to the touch panel 8 and there is no contact with the one or more contact prohibited areas ArD provided to the touch panel 8. For this reason, as compared to an aspect in which the touch panel 8 is provided with ten or less contact required areas ArT as well as an aspect in which the touch panel 8 is not provided with any contact prohibited areas ArD, the present embodiment can reduce a risk of allowing a person among the operators of the printing apparatus 100, who is not authorized to conduct any operations in the management operation mode, to succeed in logging in to the management operation mode through the operation of the touch panel 8 either by negligence or by fraud. In other words, as compared to the aspect in which the touch panel 8 is provided with ten or less contact required areas ArT as well as the aspect in which the touch panel 8 is not provided with any contact prohibited areas ArD, the present embodiment can reduce a risk of execution of an incorrect management operation of the printing apparatus 100 and a risk of execution of an unauthorized management operation of the printing apparatus 100.

Meanwhile, the printing apparatus 100 according to the present embodiment may include the transportation unit 4 provided with the charge roller 46 to charge the print paper PP, and the controlling unit 1 may control the transportation unit 4.

In the present embodiment, the touch panel 8 is provided with the eleven or more contact required areas ArT. Accordingly, even when the printing apparatus 100 includes the charge roller 46 and noise from the charge roller 46 is likely to bring about an erroneous operation of the touch panel 8, it is still possible to reduce the risk of succeeding in logging in to the management operation mode as compared to the aspect of providing the touch panel 8 with ten or less contact required areas ArT.

In the printing apparatus 100 according to the present embodiment, the 600 or more detection areas Ar may be arranged in the matrix on the touch panel 8. The touch panel 8 may include the eleven or more contact prohibited areas ArD. On the touch panel 8, the eleven or more contact required areas ArT may be not adjacent to one another. Of the 600 or more detection areas Ar, the detection area Ar adjacent to the contact required area ArT may be the contact prohibited area ArD.

As described above, in the present embodiment, the eleven or more contact required areas ArT are provided in such a way as not to be adjacent to one another, and each contact prohibited area ArD is provided in such a way as to be adjacent to the contact required area ArT. Accordingly, it is possible to reduce the risk of succeeding in logging in to the management operation mode as compared to an aspect in which the eleven or more contact required areas ArT are provided in such a way as to be adjacent to one another.

Meanwhile, the command input plate PL1 according to the present embodiment is the command input plate PL1 to be used for operating the printing apparatus 100, which includes the printing unit 2 that executes the print processing to form the printed image PPT on the print paper PP, the controlling unit 1 that controls the printing unit 2, and the interface unit 6 including the display unit 7 that displays information to the operator of the printing apparatus 100 and the capacitive touch panel 8 that accepts the command from the operator of the printing apparatus 100. Here, the touch panel 8 includes the 600 or more detection areas Ar provided with the eleven or more contact required areas ArT and the one or more contact prohibited areas ArD. The controlling unit 1 can control the printing unit 2 in accordance with the operation modes including the general operation mode of accepting the command from the touch panel 8 concerning the print processing to cause the printing unit 2 to execute the print processing and of restricting acceptance of the command from the touch panel 8 concerning the management operation of the printing apparatus 100 to cause the printing unit 2 to execute the maintenance permission processing, and the management operation mode of accepting the command from the touch panel 8 concerning the management operation of the printing apparatus 100. On the condition that the controlling unit 1 controls the printing unit 2 in accordance with the general operation mode, the controlling unit 1 permits switching of the operation mode from the general operation mode to the management operation mode when the contact with the eleven or more contact required areas ArT is detected and when the contact with the one or more contact prohibited areas ArD is not detected. The contact surface PM1-1 of the command input plate PL1 is provided with the eleven or more contact corresponding areas MT-1 set to the ground potential. The eleven or more contact corresponding areas MT-1 come into contact with all the eleven or more contact required areas ArT and come into contact with none of the one or more contact prohibited areas ArD when the contact surface PM1-1 of the command input plate PL1 is disposed to be brought into surface contact with the touch panel 8.

For this reason, as compared to the aspect in which the touch panel 8 is provided with ten or less contact required areas ArT as well as the aspect in which the touch panel 8 is not provided with any contact prohibited areas ArD, the present embodiment can reduce the risk of allowing a person among the operators of the printing apparatus 100, who is not authorized to conduct any operations in the management operation mode, to succeed in logging in to the management operation mode through the operation of the touch panel 8 either by negligence or by fraud. In other words, as compared to the aspect in which the touch panel 8 is provided with ten or less contact required areas ArT as well as the aspect in which the touch panel 8 is not provided with any contact prohibited areas ArD, the present embodiment can reduce the risk of execution of the incorrect management operation of the printing apparatus 100 and the risk of execution of the unauthorized management operation of the printing apparatus 100.

Meanwhile, according to the present embodiment, a command is inputted to the touch panel 8 by using the command input plate PL1, which includes the eleven or more contact corresponding areas MT-1 provided in such a way as to come into contact with the eleven or more contact required areas ArT but not to come into contact with the one and more contact prohibited areas ArD. For this reason, even when the command to be inputted to the touch panel 8 is a complicated command such as a command to maintain a state of contact with the eleven or more contact required areas ArT at the same time, this command can be easily inputted by use of the command input plate PL1. In other words, according to the present embodiment, it is possible to form the command concerning the management operation of the printing apparatus 100 into a complicated command. Hence, the present embodiment can reduce the risk of execution of the incorrect management operation of the printing apparatus 100 and the risk of execution of the unauthorized management operation of the printing apparatus 100 as compared to an aspect in which the command concerning the management operation of the printing apparatus 100 is a simple command.

Of the operators of the printing apparatus 100, the administrator of the printing apparatus 100, such as a serviceperson who carries out inspection work on the printing apparatus 100 and a maintainer who carries out maintenance work on the printing apparatus 100, in particular, generally wears gloves during the inspection and maintenance work for safety reasons on the printing apparatus 100. Moreover, when wearing the gloves, it is generally difficult to input commands through the touch panel 8 by touching the touch panel 8 with the fingers. For this reason, the administrator of the printing apparatus 100 needs to remove the gloves every time the administrator is required to input a command through the touch panel 8 in the course of the inspection and maintenance work on the printing apparatus 100. Accordingly, there has been a problem of prolongation of the inspection and maintenance work on the printing apparatus 100.

On the other hand, according to the present embodiment, the administrator of the printing apparatus 100 can input the command concerning the management operation of the printing apparatus 100 through the touch panel 8 only by placing the command input plate PL1 on the touch panel 8 in such a way as to bring the contact surface PM1-1 of the command input plate PL1 into surface contact with the touch panel 8. As a consequence, the present embodiment can relieve the administrator of the printing apparatus 100 from a cumbersome procedure to input the command through the touch panel 8. In other words, as compared to the aspect of inputting the command through the touch panel 8 without using the command input plate PL1, the present embodiment can suppress prolongation of the inspection and maintenance work on the printing apparatus 100, thereby improving maintainability of the printing apparatus 100.

B. MODIFIED EXAMPLES

The respective modes described above can be modified in various ways. Specific aspects of modification will be described below as examples. Two or more aspects arbitrarily selected from the following examples may be appropriately combined together to the extent not in conflict. Note that the elements in the following modified examples, which have workings and functions being equivalent to those of the embodiment, will be denoted by the reference signs used in the above description and detailed explanations thereof may be omitted as appropriate.

Modified Example 1

In the above-described embodiment, the command concerning the management operation of the printing apparatus 100 is inputted by bringing the contact surface PM1-1 of the command input plate PL1 into contact with the touch panel 8. However, the present disclosure is not limited only to this configuration. For example, the command concerning the management operation of the printing apparatus 100 may be inputted by bringing both the contact surface PM1-1 and the rear surface PM1-2 of the command input plate PL1 into contact with the touch panel 8.

In the command input plate PL1 of the present modified example, the contact surface PM1-1 is provided with the eleven or more contact corresponding area MT-1 and the rear surface PM1-2 is also provided with contact corresponding areas MT. The contact corresponding areas MT provided to the rear surface PM1-2 will be hereinafter referred to as contact corresponding areas MT-2.

Moreover, in the present modified example, the controlling unit 1 displays the administrator log-in screen GP1 on the display unit 7 in the first place, and brings the contact surface PM1-1 of the command input plate PL1 into contact with the touch panel 8. Next, the controlling unit 1 determines whether or not the eleven or more contact corresponding areas MT-1 provided on the contact surface PM1-1 are in contact with the eleven contact required areas ArT provided at the positions on the touch panel 8 as indicated in the layout pattern information JH1. Then, the controlling unit 1 displays an administrator log-in screen GP2 on the display unit 7, and brings the rear surface PM1-2 of the command input plate PL1 into contact with the touch panel 8. Next, the controlling unit 1 determines whether or not it is appropriate to permit the log-in to the management operation mode based on positions of contact of the contact corresponding areas MT-2 provided on the rear surface PM1-2.

FIG. 14 is a diagram illustrating an example of the administrator log-in screen GP2 displayed on the display unit 7 according to the present modified example.

As illustrated in FIG. 14, the administrator log-in screen GP2 includes an input acceptance area image Grp2 that indicates an input acceptance area Arp2 on the touch panel 8. Here, the input acceptance area Arp2 is an area on the touch panel 8 for accepting the input of the command from the administrator of the printing apparatus 100 when the administrator log-in screen GP2 is displayed on the display unit 7. The present modified example assumes a case where input acceptance area Arp2 is the same area as the input acceptance area Arp1. Here, the "same area" means the area having the same form and the same size, which is provided as the same position. However, the input acceptance area Arp2 may be a different area from the input acceptance area Arp1 instead.

Figure 15:
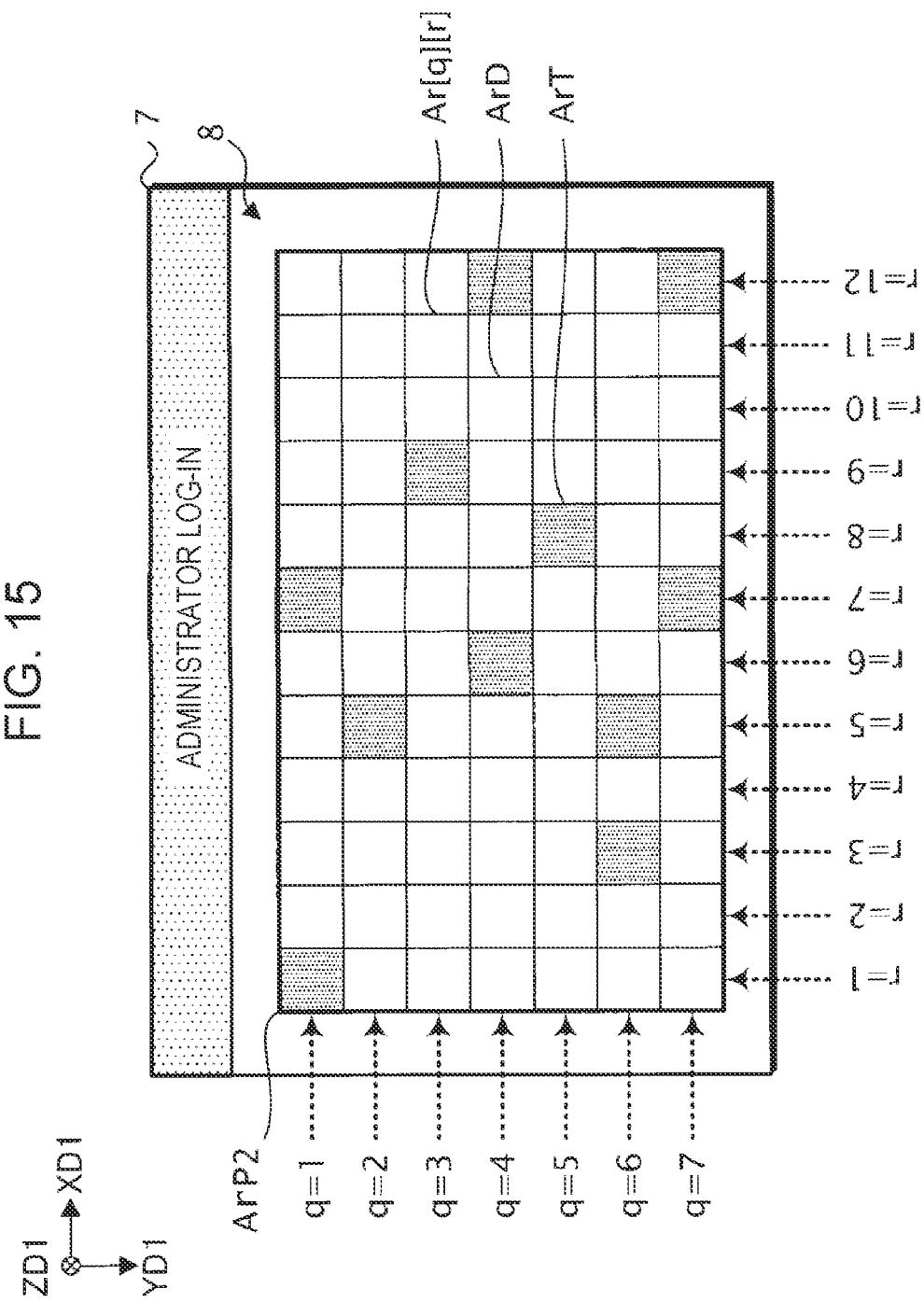
FIG. 15 is a diagram illustrating an example of an input acceptance area according to the Modified Example 1.

FIG. 15 is an explanatory diagram for explaining an example of the input acceptance area Arp2 on the touch panel 8.

As illustrated in FIG. 15, the touch panel 8 according to the present modified example includes (Q×R) detection areas Ar in the input acceptance area Arp2 as with the input acceptance area Arp1, which correspond to the (Q×R) touch sensors Ts.

Note that the value Q and the value R are natural numbers that satisfy (Q×R)≥600 in the present modified example as well. Moreover, FIG. 15 illustrates an example in which the value Q is "7" and the value R is "12" as with FIG. 8. However, this arrangement is made solely for the convenience of illustration and the touch panel 8 according to the present modified example is supposed to include the 600 or more detection areas Ar in reality as mentioned earlier.

As illustrated in FIG. 15, the eleven or more contact required areas ArT and the one or more contact prohibited areas ArD are provided in the input acceptance area Arp2 included in the touch panel 8. Note that the eleven or more contact required areas ArT provided in the input acceptance area Arp2 are an example of "eleven or more third detection points" and the one or more contact prohibited areas ArD provided in the input acceptance area Arp2 are an example of "one or more fourth detection points".

The present modified example assumes an exemplary case in which the eleven contact required areas ArT and the (Q×R−11) contact prohibited areas ArD are provided in the input acceptance area Arp2 on the touch panel 8.

Here, FIG. 15 illustrates the example in which a detection area Ar[1][1], a detection area Ar[1][7], a detection area Ar[2][5], a detection area Ar[3][9], a detection area Ar[4][6], a detection area Ar[4][12], a detection area Ar[5][8], a detection area Ar[6][3], a detection area Ar[6][5], a detection area Ar[7][7], and a detection area Ar[7] among the detection areas Ar provided in the input acceptance area Arp2 on the touch panel 8 are the contact required areas ArT and the rest of the detection areas Ar are the contact prohibited areas ArD.

In the present modified example, the eleven contact required areas ArT are provided in the input acceptance area Arp2 included in the touch panel 8 in such a way as not to be adjacent to one another. In other words, in the input acceptance area Arp2 included in the touch panel 8 of the present modified example, each detection area Ar adjacent to the contact required area ArT is the contact prohibited area ArD.

The controlling unit 1 according to the present modified example permits the administrator of the printing apparatus 100 to log in to the management operation mode in the course of the log-in processing when all the eleven contact required areas ArT provided in the input acceptance area Arp1 detect the contact, when all the eleven contact required areas ArT provided in the input acceptance area Arp2 detect the contact, when all the (Q×R−11) contact prohibited areas ArD provided in the input acceptance area Arp1 do not detect the contact, and when all the (Q×R−11) contact prohibited areas ArD provided in the input acceptance area Arp2 do not detect the contact. In other words, the controlling unit 1 according to the present modified example does not permit the administrator of the printing apparatus 100 to log in to the management operation mode in the course of the log-in processing when one or more contact required areas ArT out of the eleven contact required areas ArT provided in the input acceptance area Arp1 do not detect the contact, when one or more contact required areas ArT out of the eleven contact required areas ArT provided in the input acceptance area Arp2 do not detect the contact, when one or more contact prohibited areas ArD out of the (Q×R−11) contact prohibited areas ArD provided in the input acceptance area Arp1 detect the contact, or when one or more contact prohibited areas ArD out of the (Q×R−11) contact prohibited areas ArD provided in the input acceptance area Arp2 detect the contact.

Figure 16:
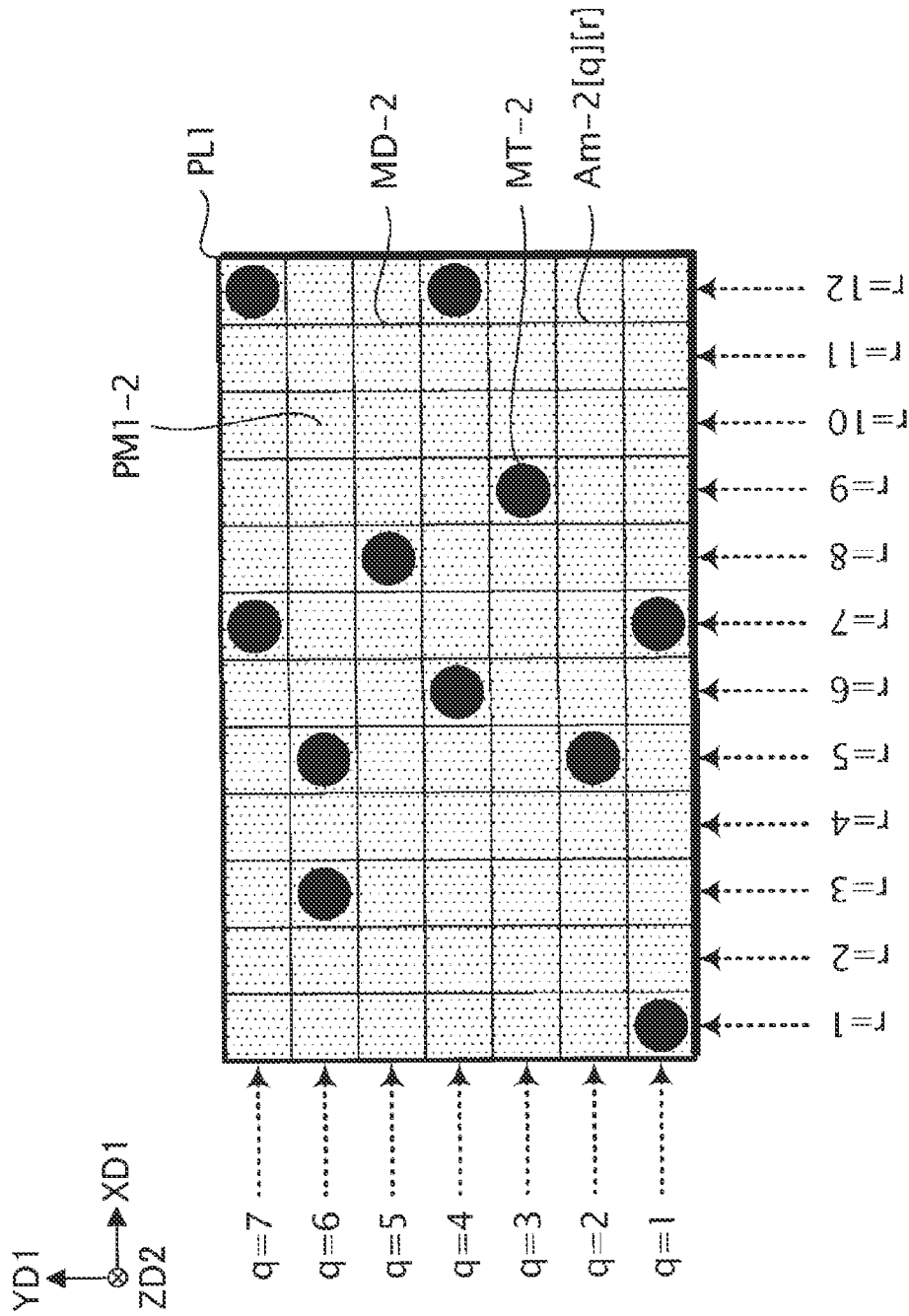
FIG. 16 is a plan view illustrating an example of a rear surface of the command input plate according to the Modified Example 1.

FIG. 16 is a plan view illustrating the rear surface PM1-2 of the command input plate PL1 according to the present modified example. Note that FIG. 16 is a plan view of the rear surface PM1-2 of the command input plate PL1 in the ZD2 direction when the rear surface PM1-2 of the command input plate PL1 is in contact with the touch panel 8.

As illustrated in FIG. 16, the command input plate PL1 of the present modified example includes the contact surface PM1-1 and the rear surface PM1-2 on the opposite side from the contact surface PM1-1. In the present modified example, the administrator of the printing apparatus 100 inputs the command to the touch panel 8 by bringing the contact surface PM1-1 of the command input plate PL1 into contact with the input acceptance area Arp1 on the touch panel 8 and then bringing the rear surface PM1-2 of the command input plate PL1 into contact with the input acceptance area Arp2 on the touch panel 8. Note that the command input plate PL1 is an example of the "jig" in the present modified example. Meanwhile, the contact surface PM1-1 is an example of the "first surface" and the rear surface PM1-2 is an example of a "second surface" in the present modified example. Moreover, the command input plate PL1 and the input acceptance area Arp2 have substantially the same size in the present modified example.

As illustrated in FIG. 16, the rear surface PM1-2 includes partial areas Am-2 corresponding one-to-one to the detection areas Ar provided in the input acceptance area Arp2. As discussed earlier, in the present modified example, the input acceptance area Arp2 includes the (Q×R) detection areas Ar arranged in the Q rows in the YD axis direction and the R columns in the XD axis direction. Moreover, in the present modified example, the input acceptance area Arp2 also includes the (Q×R) partial areas Am-2 arranged in the Q rows in the YD axis direction and the R columns in the XD axis direction on the rear surface PM1-2. A partial area Am-2 on the q-th row and the r-th column out of the (Q×R) partial areas Am-2 may be hereinafter referred to as a partial area Am-2[q][r] as appropriate.

Moreover, in the present modified example, the rear surface PM1-2 is provided with the eleven or more contact corresponding areas MT-2 that correspond one-to-one to the eleven or more contact required areas ArT provided in the input acceptance area Arp2, and one or more prohibition corresponding areas MD-2 that correspond one-to-one to the one or more contact prohibited areas ArD provided in the input acceptance area Arp2. To be more precise, the rear surface PM1-2 is provided with the eleven or more contact corresponding areas MT-2 in such a way that all the eleven or more contact required areas ArT provided in the input acceptance area Arp2 come into contact with the eleven or more contact corresponding areas MT-2 provided on the rear surface PM1-2, respectively, when the rear surface PM1-2 is brought into contact with the input acceptance area Arp2.

Here, the eleven or more contact corresponding areas MT-2 are an example of "eleven or more second contact points".

Figure 17:
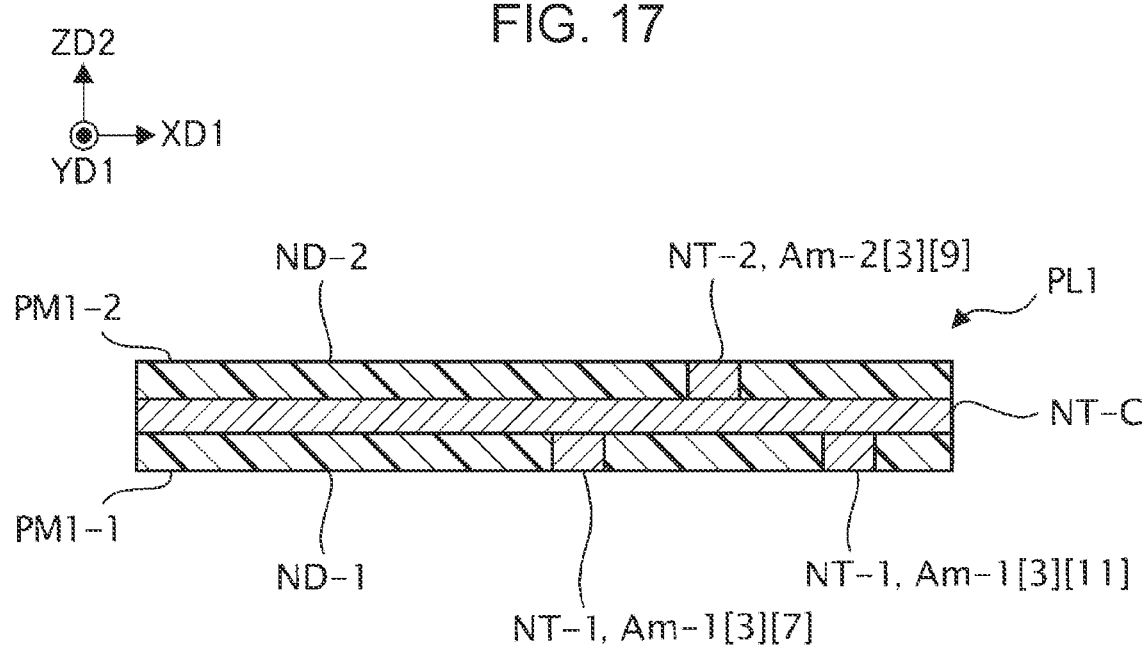
FIG. 17 is a cross-sectional view illustrating the example of the command input plate according to the Modified Example 1.

FIG. 17 is a cross-sectional view of the command input plate PL1 according to the present modified example, which is taken along a plane perpendicular to the contact surface PM1-1. To be more precise, FIG. 17 is the cross-sectional view of the command input plate PL1 illustrated in FIG. 16, which is taken along the plane that passes through the column "r=3" in FIG. 16 and is perpendicular to the contact surface PM1-1.

As illustrated in FIG. 17, the command input plate PL1 according to the present modified example is different from the command input plate PL1 according to the above-described embodiment in that the command input plate PL1 of the modified example includes conductive portions NT-2 provided between the conductive portion NT-C and the rear surface PM1-2. Here, the conductive portions NT-2 are formed from a conductive material such as a metal, and are electrically coupled to the conductive portion NT-C.

In the present modified example, the conductive portions NT-2 are provided in the contact corresponding areas MT-2. Meanwhile, in the present modified example, the non-conductive portion ND-2 is provided to the prohibition corresponding areas MD-2. Accordingly, in the present modified example, the touch panel 8 detects the contact of the contact corresponding areas MT-2 provided on the rear surface PM1-2 with the contact required area ArT provided in the input acceptance area Arp2 when the rear surface PM1-2 of the command input plate PL1 is brought into contact with the input acceptance area Arp2 on the touch panel 8. In the meantime, the touch panel 8 does not detect the contact from the contact prohibited area ArD in the input acceptance area Arp2, which comes into contact with the prohibition corresponding area MD-2 provided on the rear surface PM1-2, when the rear surface PM1-2 of the command input plate PL1 is brought into contact with the input acceptance area Arp2 on the touch panel 8.

Figure 18:
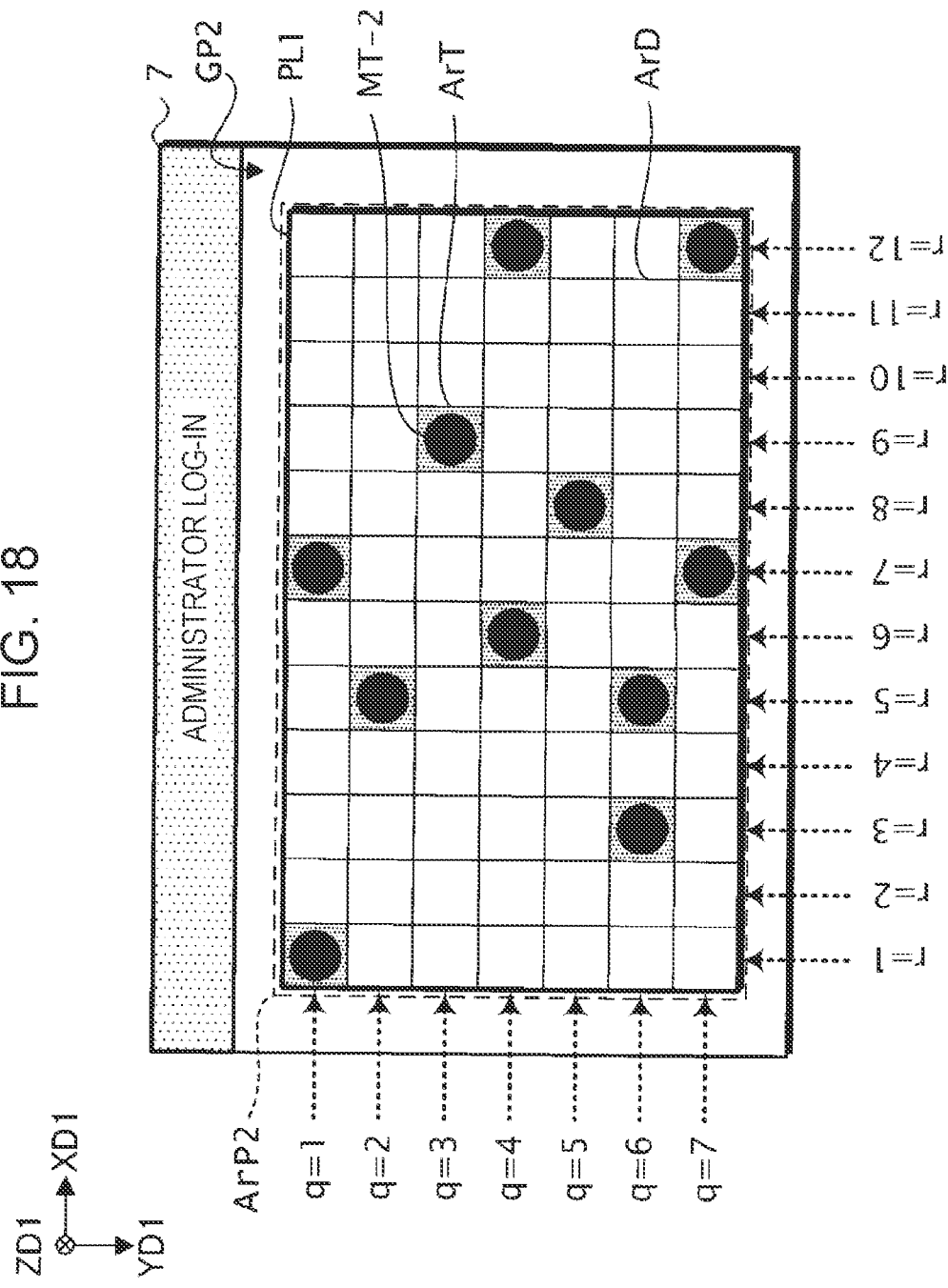
FIG. 18 is a diagram illustrating an example of a relation between the command input plate and the input acceptance area according to the Modified Example 1.

FIG. 18 is a plan view of the command input plate PL1 and the touch panel 8 in the Z1 direction when the rear surface PM1-2 of the command input plate PL1 illustrated in FIGS. 16 and 17 comes into contact with the touch panel 8.

As illustrated in FIG. 18, when the rear surface PM1-2 is brought into contact with the input acceptance area Arp2, the eleven contact corresponding areas MT-2 provided to the command input plate PL1 come into contact with the eleven contact required areas ArT provided in the input acceptance area Arp2 on the touch panel 8, respectively. Meanwhile, when the rear surface PM1-2 is brought into contact with the input acceptance area Arp2, the (Q×R−11) prohibition corresponding areas MD-2 provided to the command input plate PL1 come into contact with the (Q×R−11) contact prohibited areas ArD provided in the input acceptance area Arp2 on the touch panel 8, respectively. As a consequence, in the present modified example, the touch panel 8 detects the contact with all the eleven contact required areas ArT provided in the input acceptance area Arp2 but does not detect the contact with all the (Q×R−11) contact prohibited areas ArD provided in the input acceptance area Arp2.

Note that FIGS. 16 to 18 illustrate the example in which a partial area Am-2[1][1], a partial area Am-2[1][7], a partial area Am-2[2][5], a partial area Am-2[3][9], a partial area Am-2[4][6], a partial area Am-2[4][12], a partial area Am-2[5][8], a partial area Am-2[6][3], a partial area Am-2[6][5], a partial area Am-2[7][7], and a partial area Am-2[7] out of the partial areas Am-2 provided to the command input plate PL1 are the contact corresponding areas MT-2 provided with the conductive portions NT-2, and the rest of the partial areas Am-2 are the prohibition corresponding areas MD-2 provided with the non-conductive portion ND-2. As a consequence, when the rear surface PM1-2 of the command input plate PL1 comes into contact with the touch panel 8, the eleven contact corresponding areas MT-2 come into contact with the eleven contact required areas ArT, respectively as illustrated in FIG. 18.

The command acceptance processing according to the present modified example will be described below with reference to FIGS. 19 and 20.

Figure 19:
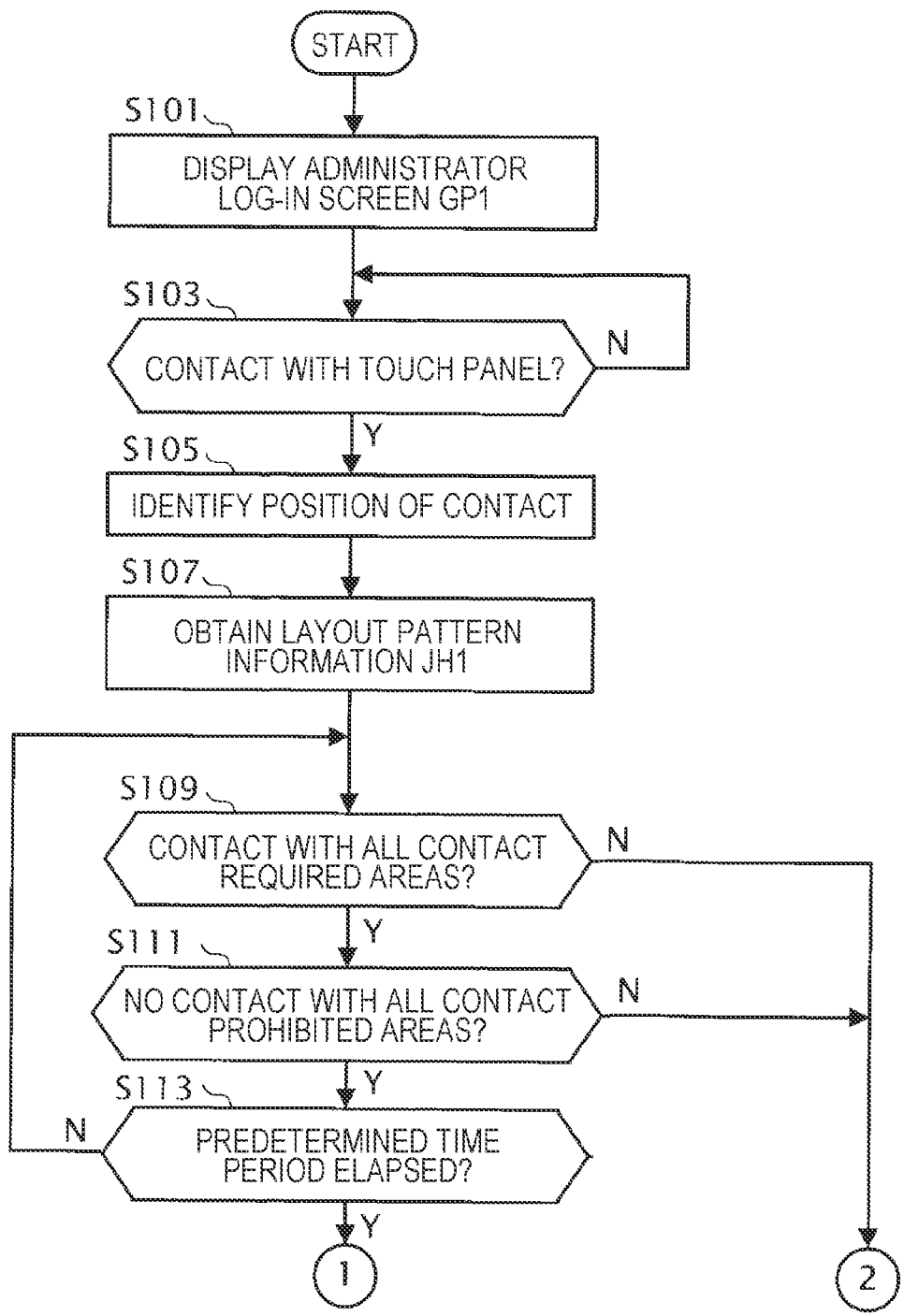
FIG. 19 is a flowchart illustrating an example of command acceptance processing according to the Modified Example 1.
Figure 20:
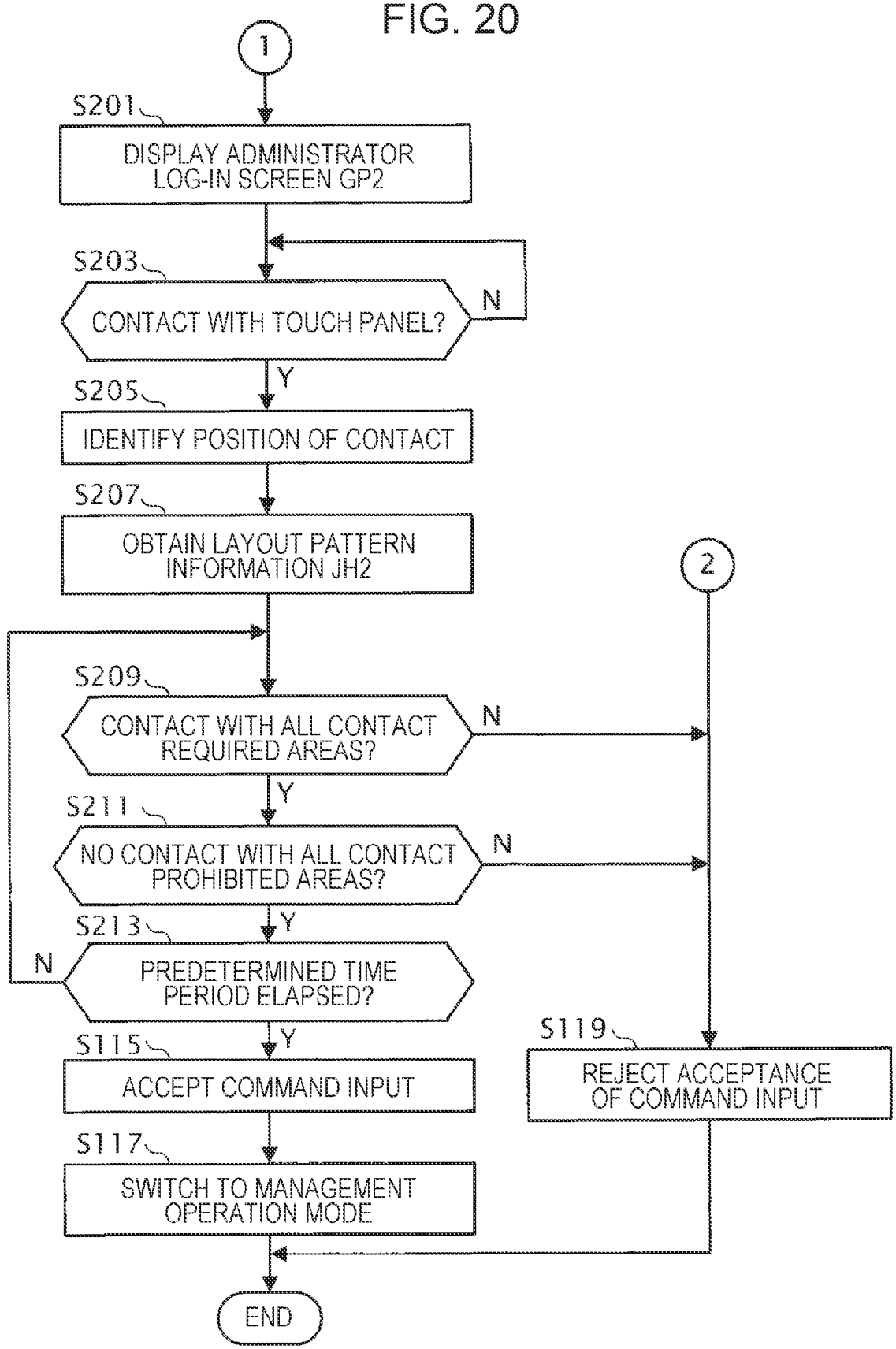
FIG. 20 is another flowchart illustrating the example of the command acceptance processing according to the Modified Example 1.

FIGS. 19 and 20 are flowcharts illustrating an operation by the printing apparatus 100 according to the present modified example when the printing apparatus 100 executes the command acceptance processing.

In the present modified example, the command acceptance processing illustrated in FIGS. 19 and 20 is started when the administrator menu button B03 is touched on the main menu screen G0 as with the above-described embodiment.

As illustrated in FIG. 19, when the command acceptance processing is started, the controlling unit 1 executes the processing in steps S101 to S113 described above in the present modified example as well.

As illustrated in FIG. 20, the display control unit 17 causes the display unit 7 to display the administrator log-in screen GP2 when the result of determination in step S113 is affirmative (S201).

Next, the input acceptance unit 18 determines based on the contact information DT as to whether or not there is the contact with the touch panel 8 (S203).

The input acceptance unit 18 moves the processing to step S203 when a result of determination in step S203 is negative.

When the result of determination in step S203 is affirmative, the input acceptance unit 18 obtains the contact information DT provided from the touch panel 8, and identifies a position of contact of an object with the touch panel 8 based on the obtained contact information DT (S205).

The present modified example assumes that the storage unit 10 stores layout pattern information JH2. The layout pattern information JH2 is information indicating a layout pattern of the eleven or more contact required areas ArT in the input acceptance area Arp2. To be more precise, the layout pattern information JH2 may be information indicating the numbers of rows q and columns r of the detection areas Ar[q][r] defined as the contact required areas ArT in the input acceptance area Arp2, for example.

Then, in the command acceptance processing according to the present modified example, the input acceptance unit 18 obtains the layout pattern information JH2 from the storage unit 10 (S207).

Next, the input acceptance unit 18 determines based on the contact information DT obtained in step S205 that there is the contact with all the contact required areas ArT indicated in the layout pattern information JH2 that is obtained in step S207 (S209).

The input acceptance unit 18 moves the processing to step S119 when a result of determination in step S209 is negative.

When the result of determination in step S209 is affirmative, the input acceptance unit 18 determines based on the contact information DT obtained in step S205 that there is no contact with all the contact prohibited areas ArD identified based on the layout pattern information JH2 that is obtained in step S207 (S211).

The input acceptance unit 18 moves the processing to step S119 when a result of determination in step S211 is negative.

When the result of determination in step S211 is affirmative, a determination is made as to whether or not a predetermined time period has elapsed since the timing of determination that the contact with the touch panel 8 was detected in step S203 (S213).

The input acceptance unit 18 moves the processing to step S209 when a result of determination in step S213 is negative.

When the result of determination in step S213 is affirmative, the input acceptance unit 18 executes the processing in steps S115 and S117 described above, and then terminates the command acceptance processing illustrated in FIGS. 19 and 20.

On the other hand, when the result of determination in any of steps S109, S111, S209, and S211 is negative, the input acceptance unit 18 executes the processing in step S119 described above, and then terminates the command acceptance processing illustrated in FIGS. 19 and 20.

As described above, in the printing apparatus 100 according to the present modified example, the 600 or more detection areas Ar provided in the input acceptance area Arp1 include the eleven or more contact required areas ArT in the input acceptance area Arp1 and the one and more contact prohibited areas ArD in the input acceptance area Arp1, and the 600 or more detection areas Ar provided in the input acceptance area Arp2 include the eleven or more contact required areas ArT in the input acceptance area Arp2 and the one and more contact prohibited areas ArD in the input acceptance area Arp2. Here, on the condition that controlling unit 1 controls the printing unit 2 in accordance with the general operation mode, the controlling unit 1 permits switching of the operation mode from the general operation mode to the management operation mode when the contact with the eleven or more contact required areas ArT in the input acceptance area Arp1 is detected, when the contact with the one or more contact prohibited areas ArD in the input acceptance area Arp1 is not detected, when the contact with the eleven or more contact required areas ArT in the input acceptance area Arp2 is detected, and when the contact with the one or more contact prohibited areas ArD in the input acceptance area Arp2 is not detected.

For this reason, as compared to any of the aspect in which the touch panel 8 is provided with ten or less contact required areas ArT, the aspect in which the touch panel 8 is not provided with any contact prohibited areas ArD, an aspect in which the contact with the contact required areas ArT provided in the input acceptance area Arp2 is not taken into consideration, and an aspect in which the non-contact with contact prohibited areas ArD provided in the input acceptance area Arp2 is not taken into consideration, the present modified example can reduce the risk of allowing a person among the operators of the printing apparatus 100, who is not authorized to conduct any operations in the management operation mode, to succeed in logging in to the management operation mode through the operation of the touch panel 8 either by negligence or by fraud. Thus, the present modified example can reduce the risk of execution of the incorrect management operation of the printing apparatus 100 and the risk of execution of the unauthorized management operation of the printing apparatus 100.

In the present modified example, the 600 or more detection areas Ar provided in the input acceptance area Arp1 include the eleven or more contact required areas ArT in the input acceptance area Arp1 and the one and more contact prohibited areas ArD in the input acceptance area Arp1, and the 600 or more detection areas Ar provided in the input acceptance area Arp2 include the eleven or more contact required areas ArT in the input acceptance area Arp2 and the one and more contact prohibited areas ArD in the input acceptance area Arp2. Here, on the condition that controlling unit 1 controls the printing unit 2 in accordance with the general operation mode, the controlling unit 1 permits switching of the operation mode from the general operation mode to the management operation mode when the contact with the eleven or more contact required areas ArT in the input acceptance area Arp1 is detected, when the contact with the one or more contact prohibited areas ArD in the input acceptance area Arp1 is not detected, when the contact with the eleven or more contact required areas ArT in the input acceptance area Arp2 is detected, and when the contact with the one or more contact prohibited areas ArD in the input acceptance area Arp2 is not detected. Meanwhile, the rear surface PM1-2 of the command input plate PL1 is provided with the eleven or more contact corresponding areas MT-2 set to the ground potential. The eleven or more contact corresponding areas MT-2 come into contact with all the eleven or more contact required areas ArT in the input acceptance area Arp2 and come into contact with none of the one or more contact prohibited areas ArD in the input acceptance area Arp2 when the rear surface PM1-2 of the command input plate PL1 is disposed to be brought into surface contact with the touch panel 8.

For this reason, as compared to the aspect of inputting the command through the touch panel 8 without using the command input plate PL1, the present modified example can suppress prolongation of the inspection and maintenance work on the printing apparatus 100, thereby improving maintainability of the printing apparatus 100.

Modified Example 2

In the embodiment and the Modified Example 1 described above, the command concerning the management operation of the printing apparatus 100 is inputted by bringing one of the two surfaces provided to the command input plate PL into contact with the touch panel 8 just once. However, the present disclosure is not limited only to this configuration. For example, the command concerning the management operation of the printing apparatus 100 may be inputted by bringing one of the two surfaces provided to the command input plate PL into contact with the touch panel 8 two or more times while changing a position or a posture thereof.

In a command input plate PL2 of the present modified example, a contact surface PM2-1 is provided with the eleven or more contact corresponding areas MT-1. Moreover, in the present modified example, the controlling unit 1 first causes the display unit 7 to display an administrator log-in screen GP3 provided with an input acceptance area image Grp3 for indicating an input acceptance area Arp3, thereby bringing the contact surface PM2-1 of the command input plate PL2 into contact with the input acceptance area Arp3 provided to the touch panel 8. Next, the controlling unit 1 causes the display unit 7 to display an administrator log-in screen GP4 provided with an input acceptance area image Grp4 for indicating an input acceptance area Arp4, thereby bringing the contact surface PM2-1 of the command input plate PL2 into contact with the input acceptance area Arp4 provided to the touch panel 8. Thereafter, the controlling unit 1 determines whether or not it is appropriate to permit the log-in to the management operation mode based on positions of contact of the eleven or more contact corresponding areas MT-1 in the course of two times of contact of the contact surface PM2-1 with the touch panel 8.

FIG. 21 is a diagram illustrating an example of the administrator log-in screen GP3 displayed on the display unit 7 according to the present modified example.

As illustrated in FIG. 21, the administrator log-in screen GP3 includes the input acceptance area image Grp3 that indicates the input acceptance area Arp3 on the touch panel 8. Here, the input acceptance area Arp3 is an area on the touch panel 8 for accepting the input of the command from the administrator of the printing apparatus 100 when the administrator log-in screen GP3 is displayed on the display unit 7.

Figure 22:
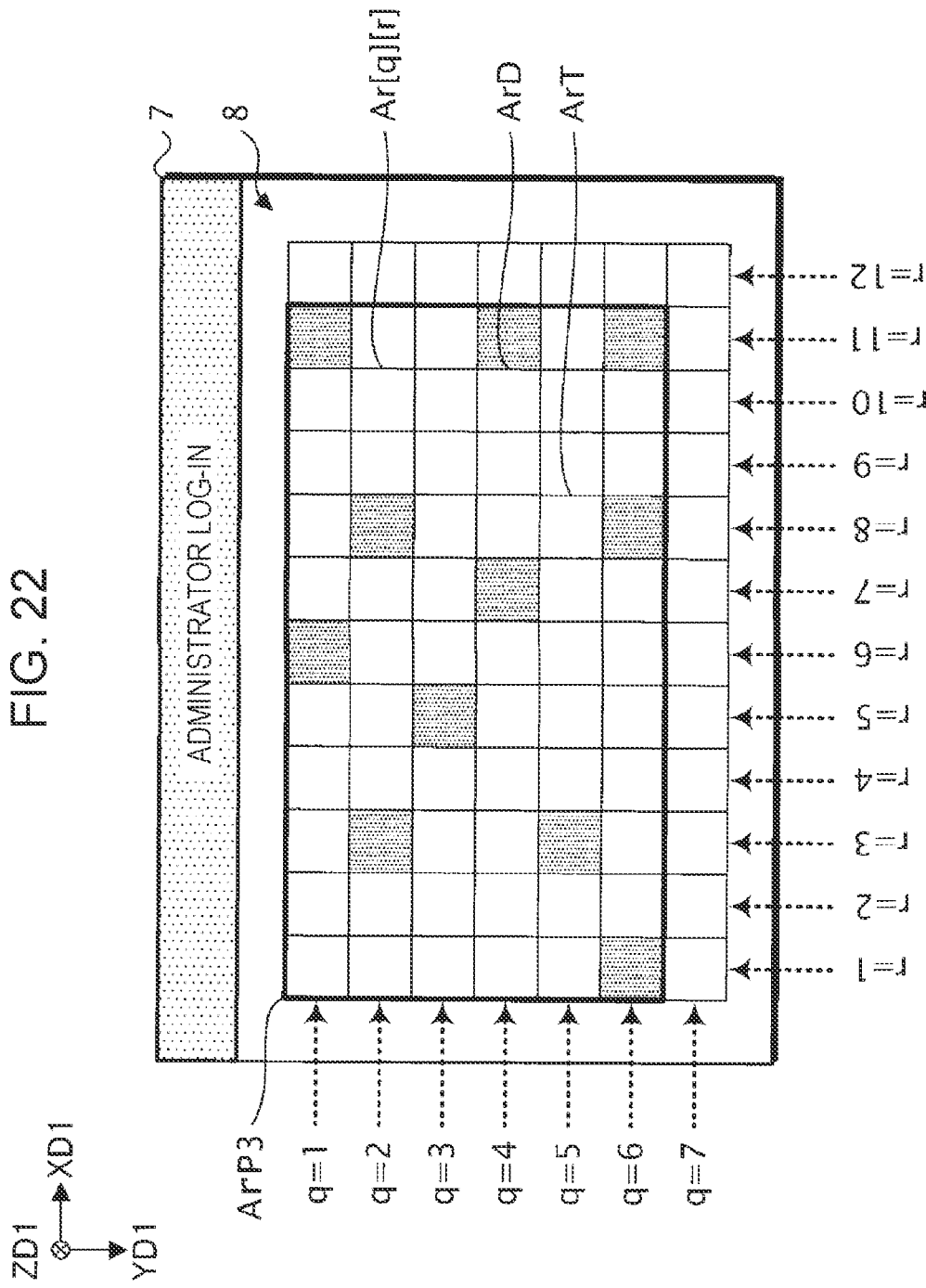
FIG. 22 is a diagram illustrating an example of an input acceptance area according to the Modified Example 2.

FIG. 22 is an explanatory diagram for explaining an example of the input acceptance area Arp3 on the touch panel 8.

As illustrated in FIG. 22, the present modified example assumes an exemplary case in which the input acceptance area Arp3 is an area that is smaller than the input acceptance area Arp1 and is included in the input acceptance area Arp1. Meanwhile, the touch panel 8 according to the present modified example includes $(Q0 \times R0)$ detection areas Ar provided in a matrix of $Q0$ rows in the YD1 direction and $R0$ columns in the XD1 direction in the input acceptance area Arp3, which correspond to the $(Q0 \times R0)$ touch sensors Ts. Here, the value $Q0$ and the value $R0$ are natural numbers that satisfy 1<Q0<0, 1<R0<R, and 200≤(Q0×R0)<600. However, the present disclosure is not limited only to this configuration. The value Q0 and the value R0 only need to be natural numbers that satisfy 22≤(Q0×R0)≤600.

FIG. 22 illustrates an example in which the value Q is "7" and the value R is "12" as with FIGS. 8 and 15. However, this arrangement is made solely for the convenience of illustration and the touch panel 8 according to the present modified example is supposed to include the 600 or more detection areas Ar in reality as mentioned earlier. Meanwhile, FIG. 22 illustrates an example in which the value Q0 is "6" and the value R0 is "11".

As illustrated in FIG. 22, the eleven or more contact required areas ArT and the one or more contact prohibited areas ArD are provided in the input acceptance area Arp3 included in the touch panel 8. Note that the eleven or more contact required areas ArT provided in the input acceptance area Arp3 are an example of the "eleven or more first detection points" and the one or more contact prohibited areas ArD provided in the input acceptance area Arp3 are another example of the "one or more second detection points".

The present modified example assumes an exemplary case in which the eleven contact required areas ArT and the (Q0×R0−11) contact prohibited areas ArD are provided in the input acceptance area Arp3 on the touch panel 8.

Here, FIG. 22 illustrates the example in which a detection area Ar[1][6], a detection area Ar[1][11], a detection area Ar[2][3], a detection area Ar[2][8], a detection area Ar[3][5], a detection area Ar[4][7], a detection area Ar[4][11], a detection area Ar[5][3], a detection area Ar[6][1], a detection area Ar[6][8], and a detection area Ar[6] among the detection areas Ar provided in the input acceptance area Arp3 on the touch panel 8 are the contact required areas ArT and the rest of the detection areas Ar are the contact prohibited areas ArD. Note that the detection areas Ar provided in an area other than the input acceptance area Arp3 when the administrator log-in screen GP3 is displayed are also the contact prohibited areas ArD in the present modified example.

In the present modified example, the eleven contact required areas ArT are provided in the input acceptance area Arp3 included in the touch panel 8 in such a way as not to be adjacent to one another. In other words, in the input acceptance area Arp3 included in the touch panel 8 of the present modified example, each detection area Ar adjacent to the contact required area ArT is the contact prohibited area ArD.

Figure 23:
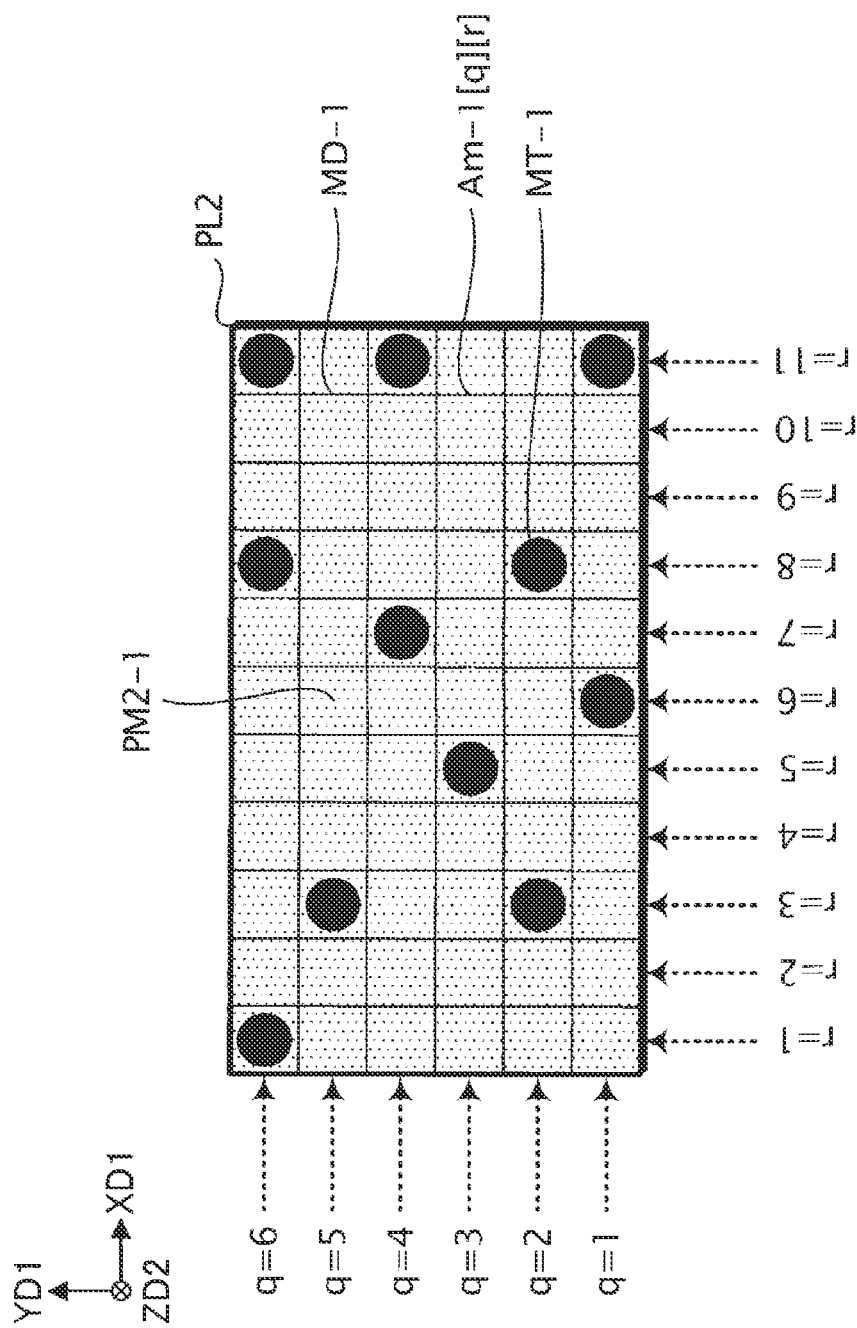
FIG. 23 is a plan view illustrating an example of a contact surface of a command input plate according to the Modified Example 2.

FIG. 23 is a plan view illustrating the contact surface PM2-1 of the command input plate PL2 according to the present modified example. Note that FIG. 23 is a plan view of the contact surface PM2-1 of the command input plate PL2 in the ZD2 direction when the contact surface PM2-1 of the command input plate PL2 is in contact with the touch panel 8.

As illustrated in FIG. 23, the contact surface PM2-1 of the command input plate PL2 of the present modified example includes the (Q0×R0) partial areas Am-1 corresponding one-to-one to the (Q0×R0) detection areas Ar provided in the input acceptance area Arp3. A partial area Am-1 on the q-th row and the r-th column out of the (Q0×R0) partial areas Am-1 may be hereinafter referred to as the partial area Am-1[q][r] as appropriate. Note that the command input plate PL2 is an example of the "jig" in the present modified example, and the contact surface PM2-1 is an example of the "first surface". Moreover, the command input plate PL2 and the input acceptance area Arp3 have substantially the same size in the present modified example.

Moreover, in the present modified example, the rear contact surface PM2-1 is provided with the eleven or more contact corresponding areas MT-1 that correspond one-to-one to the eleven or more contact required areas ArT provided in the input acceptance area Arp3, and the one or more prohibition corresponding areas MD-1 that correspond one-to-one to the one or more contact prohibited areas ArD provided in the input acceptance area Arp3. To be more precise, in the present modified example, all the eleven or more contact required areas ArT provided in the input acceptance area Arp3 come into contact with the eleven or more contact corresponding areas MT-1 provided on the contact surface PM2-1, respectively, when the contact surface PM2-1 is brought into contact with the input acceptance area Arp3.

Here, the eleven or more contact corresponding areas MT-1 are an example of the "eleven or more first contact points". The posture of the command input plate PL2 when bringing the contact surface PM2-1 into contact with the input acceptance area Arp3 will be hereinafter referred to as a reference posture.

FIG. 24 is a diagram illustrating an example of the administrator log-in screen GP4 displayed on the display unit 7 of the present modified example.

As illustrated in FIG. 24, the administrator log-in screen GP4 includes the input acceptance area image Grp4 that indicates the input acceptance area Arp4 on the touch panel 8. Here, the input acceptance area Arp4 is an area on the touch panel 8 for accepting the input of the command from the administrator of the printing apparatus 100 when the administrator log-in screen GP4 is displayed on the display unit 7.

FIG. 25 is an explanatory diagram for explaining an example of the input acceptance area Arp4 on the touch panel 8.

As illustrated in FIG. 25, the present modified example assumes an exemplary case in which the input acceptance area Arp4 is an area that is smaller than the input acceptance area Arp1 and is included in the input acceptance area Arp1. Moreover, the present modified example assumes an exemplary case in which the input acceptance area Arp4 is provided at a different position from the input acceptance area Arp3. However, the present disclosure is not limited only to this configuration. The input acceptance area Arp4 may be provided at the same position as the input acceptance area Arp3. Meanwhile, the touch panel 8 according to the present modified example includes the (Q0×R0) detection areas Ar provided in the matrix of Q0 rows in the YD1 direction and R0 columns in the XD1 direction in the input acceptance area Arp4, which correspond to the (Q0×R0) touch sensors Ts.

FIG. 25 illustrates an example in which the value Q is "7" and the value R is "12" as with FIGS. 8, 15, and 22. However, this arrangement is made solely for the convenience of illustration and the touch panel 8 according to the present modified example is supposed to include the 600 or more detection areas Ar in reality as mentioned earlier.

As illustrated in FIG. 25, the eleven or more contact required areas ArT and the one or more contact prohibited areas ArD are provided in the input acceptance area Arp4 included in the touch panel 8. Note that the eleven or more contact required areas ArT provided in the input acceptance area Arp4 are an example of the "eleven or more third detection points" and the one or more contact prohibited areas ArD provided in the input acceptance area Arp4 are an example of the "one or more fourth detection points".

The present modified example assumes an exemplary case in which the eleven contact required areas ArT and the (Q0×R0−11) contact prohibited areas ArD are provided in the input acceptance area Arp4 on the touch panel 8.

Here, FIG. 25 illustrates the example in which a detection area Ar[2][2], a detection area Ar[2][5], a detection area Ar[2][12], a detection area Ar[3][10], a detection area Ar[4][2], a detection area Ar[4][6], a detection area Ar[5][8], a detection area Ar[6][5], a detection area Ar[6][10], a detection area Ar[7][2], and a detection area Ar[7][7] among the detection areas Ar provided in the input acceptance area Arp4 on the touch panel 8 are the contact required areas ArT and the rest of the detection areas Ar are the contact prohibited areas ArD. Note that the detection areas Ar provided in an area other than the input acceptance area Arp4 when the administrator log-in screen GP4 is displayed are also the contact prohibited areas ArD in the present modified example.

In the present modified example, the eleven contact required areas ArT are provided in the input acceptance area Arp4 included in the touch panel 8 in such a way as not to be adjacent to one another. In other words, in the input acceptance area Arp4 included in the touch panel 8 of the present modified example, each detection area Ar adjacent to the contact required area ArT is the contact prohibited area ArD.

In the present modified example, the eleven contact required areas ArT provided in the input acceptance area Arp4 correspond one-to-one to the eleven contact corresponding areas MT-1 provided on the contact surface PM2-1 of the command input plate PL2 when the command input plate PL2 is turned from the reference posture by 180 degrees about the ZD axis direction as an axis of rotation. Meanwhile, in the present modified example, the (Q0×R0−11) contact prohibited areas ArD provided in the input acceptance area Arp4 correspond one-to-one to the (Q0×R0−11) prohibition corresponding areas MD-1 provided on the contact surface PM2-1 of the command input plate PL2 when the command input plate PL2 is turned from the reference posture by 180 degrees about the ZD axis direction as the axis of rotation. That is to say, in the present modified example, when the command input plate PL2 is turned from the reference posture by 180 degrees about the ZD axis direction as the axis of rotation and then the contact surface PM2-1 is brought into contact with the input acceptance area Arp4, all the eleven contact required areas ArT provided in the input acceptance area Arp4 come into contact with the eleven contact corresponding areas MT-1 provided on the contact surface PM2-1, respectively.

The orientation of the command input plate PL2 turned from the reference posture by 180 degrees will be hereinafter referred to as a turned posture.

As described above, in the present modified example, all the eleven contact required areas ArT provided in the input acceptance area Arp3 come into contact with the eleven contact corresponding areas MT-1 provided on the contact surface PM2-1 when the contact surface PM2-1 of the command input plate PL2 in the reference posture is brought into contact with the input acceptance area Arp3. Moreover, in the present modified example, all the eleven contact required areas ArT provided in the input acceptance area Arp4 come into contact with the eleven contact corresponding areas MT-1 provided on the contact surface PM2-1 when the contact surface PM2-1 of the command input plate PL2 in the turned posture is brought into contact with the input acceptance area Arp4.

In addition, the controlling unit 1 according to the present modified example permits the administrator of the printing apparatus 100 to log in to the management operation mode in the course of the log-in processing when all the eleven contact required areas ArT provided in the input acceptance area Arp3 detect the contact, when all the (Q0×R0−11) contact prohibited areas ArD provided in the input acceptance area Arp3 do not detect the contact, when all the eleven contact required areas ArT provided in the input acceptance area Arp4 detect the contact, and when all the (Q0×R0−11) contact prohibited areas ArD provided in the input acceptance area Arp4 do not detect the contact. In other words, the controlling unit 1 according to the present modified example does not permit the administrator of the printing apparatus 100 to log in to the management operation mode in the course of the log-in processing when one or more contact required areas ArT out of the eleven contact required areas ArT provided in the input acceptance area Arp3 do not detect the contact, when one or more contact required areas ArT out of the eleven contact required areas ArT provided in the input acceptance area Arp4 do not detect the contact, when one or more contact prohibited areas ArD out of the (Q0×R0−11) contact prohibited areas ArD provided in the input acceptance area Arp3 detect the contact, or when one or more contact prohibited areas ArD out of the (Q0×R0−11) contact prohibited areas ArD provided in the input acceptance area Arp4 detect the contact.

In the present modified example, an orientation of the command input plate PL2 in the reference posture is an example of a "first orientation", the position of the input acceptance area Arp3 in the touch panel 8 is an example of a "first position", an orientation of the command input plate PL2 in the turned posture is an example of a "second orientation", and the position of the input acceptance area Arp4 in the touch panel 8 is an example of a "second position".

As described above, the command input plate PL2 according to the present modified example is the command input plate PL2 to be used for operating the printing apparatus 100, which includes the printing unit 2 that executes the print processing to form the printed image PPT on the print paper PP, the controlling unit 1 that controls the printing unit 2, and the interface unit 6 including the display unit 7 that displays information to the operator of the printing apparatus 100 and the capacitive touch panel 8 that accepts the command from the operator of the printing apparatus 100. Here, the touch panel 8 includes the 600 or more detection areas Ar provided with the eleven or more contact required areas ArT in the input acceptance area Arp3, the one or more contact prohibited areas ArD in the input acceptance area Arp3, the eleven or more contact required areas ArT in the input acceptance area Arp4, and the one or more contact prohibited areas ArD in the input acceptance area Arp4. The controlling unit 1 can control the printing unit 2 in accordance with the operation modes including the general operation mode of accepting the command from the touch panel 8 concerning the print processing to cause the printing unit 2 to execute the print processing and of restricting acceptance of the command from the touch panel 8 concerning the management operation of the printing apparatus 100 to cause the printing unit 2 to execute the maintenance permission processing, and the management operation mode of accepting the command from the touch panel 8 concerning the management operation of the printing apparatus 100. On the condition that the controlling unit 1 controls the printing unit 2 in accordance with the general operation mode, the controlling unit 1 permits switching of the operation mode from the general operation mode to the management operation mode when the contact with the eleven or more contact required areas ArT in the input acceptance area Arp3 is detected, when the contact with the one or more contact prohibited areas ArD in the input acceptance area Arp3 is not detected, when the contact with the eleven or more contact required areas ArT in the input acceptance area Arp4 is detected, and when the contact with the one or more contact prohibited areas ArD in the input acceptance area Arp4 is not detected. The contact surface PM2-1 of the command input plate PL2 is provided with the eleven or more contact corresponding areas MT-1 set to the ground potential. When the contact surface PM2-1 of the command input plate PL2 comes into surface contact with the touch panel 8 and when the command input plate PL2 is set to the reference posture and disposed in the input acceptance area Arp3 of the touch panel 8, the eleven or more contact corresponding areas MT-1 come into contact with all the eleven or more contact required areas ArT in the input acceptance area Arp3 and come into contact with none of the one or more contact prohibited areas ArD in the input acceptance area Arp3. When the contact surface PM2-1 of the command input plate PL2 comes into surface contact with the touch panel 8 and when the command input plate PL2 is set to the turned posture and disposed in the input acceptance area Arp4 of the touch panel 8, the eleven or more contact corresponding areas MT-1 come into contact with all the eleven or more contact required areas ArT in the input acceptance area Arp4 and come into contact with none of the one or more contact prohibited areas ArD in the input acceptance area Arp4.

For this reason, as compared to the aspect of inputting the command through the touch panel 8 without using the command input plate PL2, the present modified example can suppress prolongation of the inspection and maintenance work on the printing apparatus 100, thereby improving maintainability of the printing apparatus 100.

Modified Example 3

In the embodiment and the Modified Examples 1 and 2 described above, the processing to accept the command to log in to the management operation mode is used as an example for explaining the command acceptance processing. However, the present disclosure is not limited only to this configuration. For instance, the command acceptance processing may be processing to accept the command concerning the management operation of the printing apparatus 100 after logging in to the management operation mode.

In the embodiment and the Modified Examples 1 and 2 described above, the processing to accept a single type of command to log in to the management operation mode is used as an example for explaining the command acceptance processing. However, the present disclosure is not limited only to this configuration. For instance, the command acceptance processing may be processing that assumes multiple types of command input plates PL. To be more precise, the command acceptance processing to be carried out by the controlling unit 1 may be processing to accept a command corresponding to a certain command input plate PL among multiple types of commands when the certain command input plate PL out of multiple command input plates PL corresponding to the multiple types of commands comes into contact with the touch panel 8.

Modified Example 4

In the embodiment and the Modified Examples 1 to 3 described above, the printing apparatus 100 is explained as an example of the agent of execution of the command acceptance processing. However, the present disclosure is not limited only to this configuration. The command acceptance processing may be executed by an arbitrary electronic device that includes the interface unit 6 provided with the display unit 7 and the touch panel 8.

In the embodiment and the Modified Examples 1 to 3 described above, the printing apparatus 100 is an example of the "electronic device", the printing unit 2 is an example of a "driving unit", the command concerning the print processing is the example of the "first instruction", and the command concerning the management operation of the printing apparatus 100 is the example of the "second instruction".

Specifically, the electronic device according to the present modified example includes the control unit that controls the driving unit, and the interface unit including the display unit that displays information to the user and the capacitive touch panel that accepts the instruction from the user. Here, the touch panel includes the 600 or more detection areas Ar provided with the eleven or more contact required areas ArT and the one or more contact prohibited areas ArD. The control unit can control the driving unit in accordance with the operation modes including the first mode of accepting the first instruction from the touch panel to drive the driving unit and of restricting acceptance of the second instruction from the touch panel to cause the driving unit to execute the processing concerning maintenance, and the second mode of accepting the second instruction from the touch panel. On the condition that the control unit controls the driving unit in accordance with the first mode, the control unit permits switching of the operation mode from the first mode to the second mode when the contact with the eleven or more contact required areas ArT is detected and when the contact with the one or more contact prohibited areas ArD is not detected.

As a consequence, as compared to the aspect in which the touch panel is provided with ten or less contact required areas ArT as well as the aspect in which the touch panel is not provided with any contact prohibited areas ArD, the present modified example can reduce the risk of execution of the incorrect management operation of the driving unit and the risk of execution of the unauthorized management operation of the driving unit.

What is claimed is:

1. An image forming apparatus comprising:
a printer that executes image formation processing to form an image on a medium;
a processor that controls the printer; and
an interface unit including
a display unit that displays information to a user, and
a capacitive touch panel that detects a touch operation from the user to accept an instruction from the user, wherein
the touch panel includes six hundred or more detection points at each of which the touch operation from the user is detectable, the six hundred or more detection points including
eleven or more first detection points, and
one or more second detection points,
the processor is configured to control the printer in accordance with operation modes including
a first mode of accepting a first instruction from the touch panel to cause the printer to execute the image formation processing and of restricting acceptance of a second instruction from the touch panel to cause the printer to execute processing concerning maintenance, and a second mode of accepting the second instruction from the touch panel, and on a condition that the processor controls the printer in accordance with the first mode, the processor permits switching of the operation mode from the first mode to the second mode in response to determining that the touch operation occurs at all of the eleven or more first detection points and determining that the touch operation does not occur at any one of the one or more second detection points.

2. The image forming apparatus according to claim 1, further comprising:

a charge roller that charges the medium, wherein the processor controls the charge roller.

3. The image forming apparatus according to claim 1, wherein the six hundred or more detection points are arranged in a matrix on the touch panel, the one or more second detection points includes eleven or more second detection points, the eleven or more first detection points are not adjacent to one another on the touch panel, and each of the eleven or more first detection points are adjacent to respective one of the eleven or more second detection points.

4. The image forming apparatus according to claim 1, wherein the six hundred or more detection points include eleven or more third detection points, and one or more fourth detection points, on the condition that the processor controls the printer in accordance with the first mode, the processor permits switching of the operation mode from the first mode to the second mode in response to determining that the touch operation occurs at all of the eleven or more first detection points, determining that the touch operation does not occur at any one of the one or more second detection points, determining that the touch operation occurs at all of the eleven or more third detection points, and determining that the touch operation does not occur at any one of the one or more fourth detection points.

* * * * *